(12) United States Patent
Begnaud et al.

(10) Patent No.: US 12,252,941 B2
(45) Date of Patent: Mar. 18, 2025

(54) CONTROL LINE CLAMP INSTALLATION SYSTEM

(71) Applicant: Frank's International, LLC, Houston, TX (US)

(72) Inventors: Brian David Begnaud, Lafayette, LA (US); Dougal Hugo Brown, Scotland (GB); Malcolm Gray-Stephens, Laurencekirk (GB)

(73) Assignee: FRANK'S INTERNATIONAL, LLC, Houston, TX (US)

( * ) Notice: Subject to any disclaimer, the term of this patent is extended or adjusted under 35 U.S.C. 154(b) by 43 days.

(21) Appl. No.: 18/167,298

(22) Filed: Feb. 10, 2023

(65) Prior Publication Data
US 2024/0271493 A1 Aug. 15, 2024

(51) Int. Cl.
*E21B 19/08* (2006.01)
*E21B 17/02* (2006.01)
*E21B 17/10* (2006.01)

(52) U.S. Cl.
CPC ........ *E21B 17/1035* (2013.01); *E21B 17/026* (2013.01); *E21B 19/08* (2013.01)

(58) Field of Classification Search
CPC .... E21B 17/1035; E21B 17/026; E21B 19/08; E21B 23/14
See application file for complete search history.

(56) References Cited

U.S. PATENT DOCUMENTS

| | | |
|---|---|---|
| 8,191,641 B2 | 6/2012 | Boutwell, Jr. et al. |
| 9,637,984 B2 | 5/2017 | Webre et al. |
| 2003/0145984 A1* | 8/2003 | Webre ..................... E21B 19/07 166/66 |
| 2008/0308281 A1* | 12/2008 | Boutwell, Jr. .......... E21B 29/04 166/385 |
| 2012/0211217 A1 | 8/2012 | Boutwell, Jr. et al. |

(Continued)

FOREIGN PATENT DOCUMENTS

| | | |
|---|---|---|
| NO | 20220040 A1 | 12/2022 |
| WO | 2009022912 A1 | 2/2009 |

OTHER PUBLICATIONS

Extended European Search Report dated May 10, 2024, EP Application No. 24156924.3, 7 pages.

*Primary Examiner* — Tara Schimpf
*Assistant Examiner* — Jennifer A Railey
(74) *Attorney, Agent, or Firm* — MH2 Technology Law Group, LLP

(57) ABSTRACT

An installation system for installing a control line clamp onto a tubular string includes a first load plate, a second load plate that is offset from the first load plate, the first and second load plates being configured to engage a first clamp member and a second clamp member, respectively, positioned on a tubular string, a retention lid positioner configured to couple the retention lid with the first and second clamp members, a sensor system configured to provide feedback signals representing that the first and second load plates are received around the tubular and aligned with a control line, the retention lid is positioned at a target location and aligned with the control line, and the first and second load plates are adducted together to press the first and second clamp members together, and an indication device configured to indicate a state of the installation system.

24 Claims, 24 Drawing Sheets

(56) References Cited

U.S. PATENT DOCUMENTS

| | | | |
|---|---|---|---|
| 2013/0075114 A1* | 3/2013 | Dekker | E21B 19/166 166/380 |
| 2014/0055141 A1* | 2/2014 | Carlson | G01V 3/08 324/326 |
| 2018/0148983 A1 | 5/2018 | Hagen | |
| 2021/0215005 A1 | 7/2021 | Jahn et al. | |

* cited by examiner

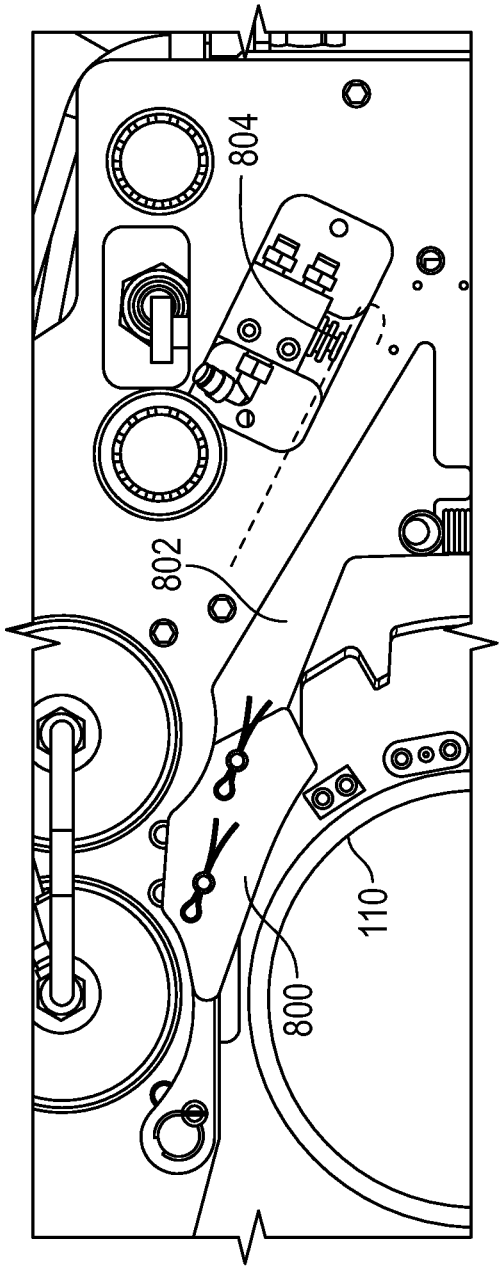
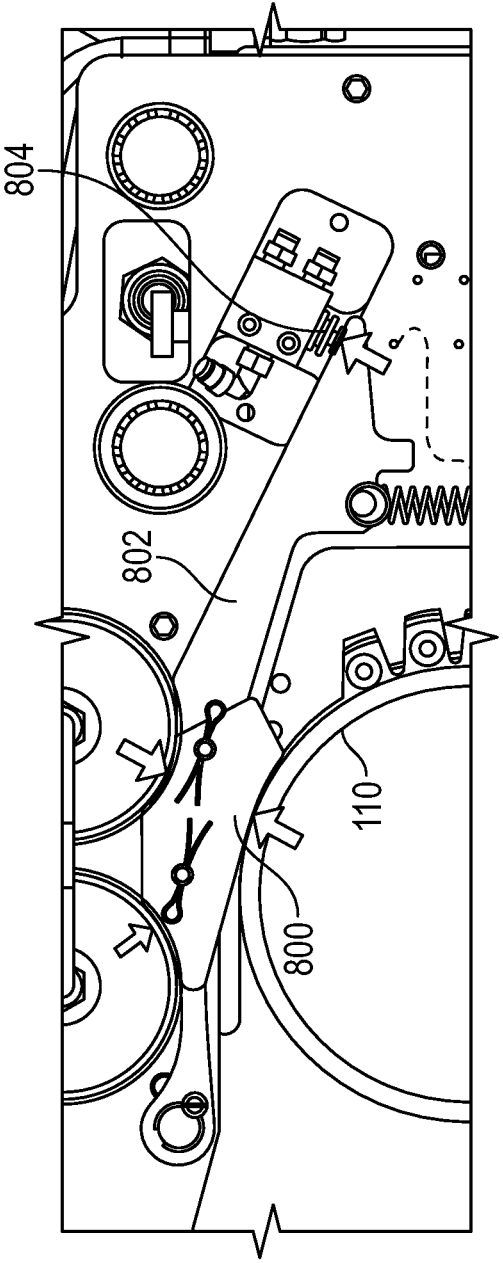
FIG. 9A
FIG. 9B

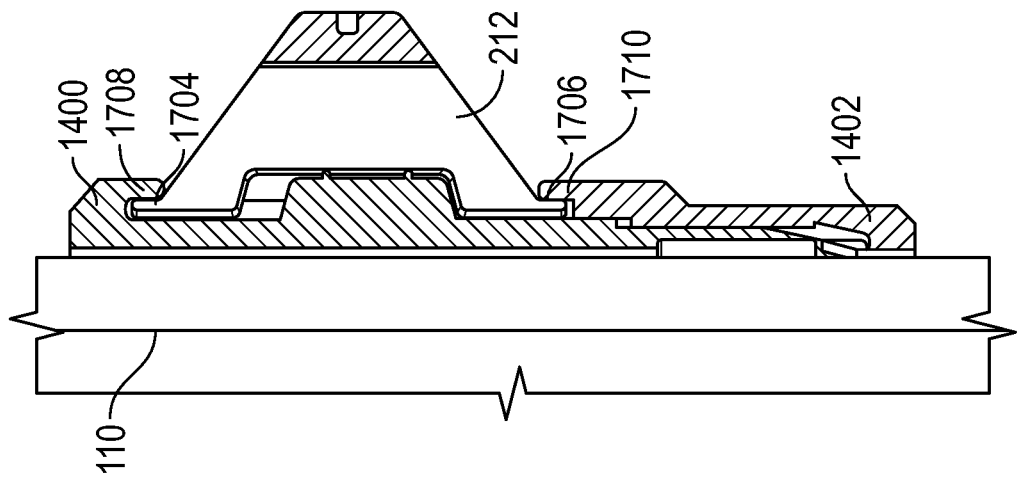
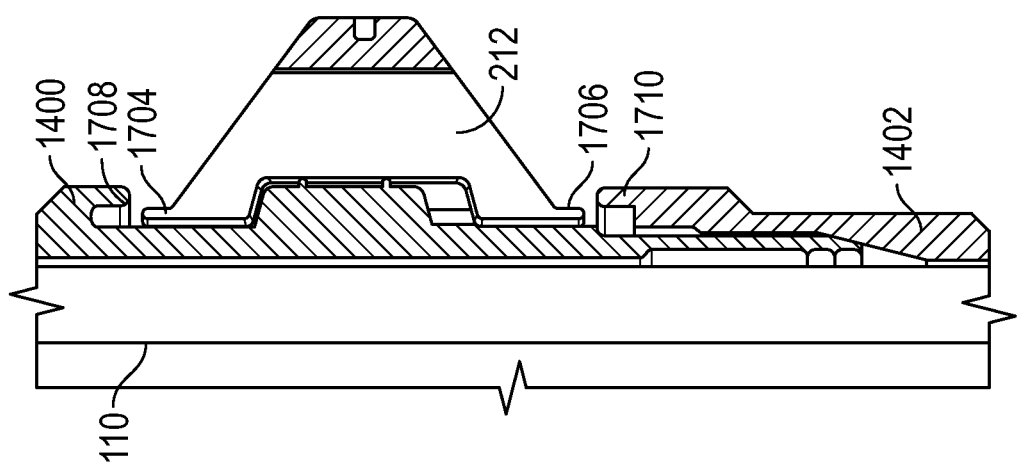

CONTROL LINE CLAMP INSTALLATION SYSTEM

BACKGROUND

Oil and gas wells may be equipped with control lines for mechanically, electrically, pneumatically, hydraulically, or optically linking various downhole devices to the surface. Control lines may be used to receive data from downhole instruments and/or to operate downhole devices such as valves, switches, sensors, relays, or other devices. For example, control lines may be used to open, close, or adjust downhole valves to selectively produce or isolate formations at locations deep in the well. A control line may transmit data gathered downhole to the surface or communicate commands to downhole devices to take samples, readings, or to stroke valves. Control lines may include electrically conductive wires or cables, optical fibers, or fluid conduits for pneumatically or hydraulically controlling downhole devices or transmitting data.

The downhole instruments and devices are typically integrated with the string of completion tubulars that serve as the production conduit from the bottom of the wellbore to the surface hardware. Control lines generally have a small diameter relative to the diameter of the completion string to which they are secured. For example, an individual control line may be between 0.5 cm and 2.5 cm in diameter. However, multiple control lines may be aggregated to form a flatpack comprising two or three control lines in a synthetic polymer casing or larger umbilical of a diameter of up to 7.0 cm or more.

Control lines are generally secured along the length of the outer surface of a pipe string, generally parallel to the center axis of the bore of the pipe string using control line clamps. Continuous control lines are fed from storage reels adjacent to the rig floor and secured to the pipe string using control line clamps at intervals along the string as the tubular string is run downhole. The control line clamps may be installed in conjunction with the joints of pipe being made up into a pipe string, as the pipe string is being run into a well.

Control line clamps may be "wrap-around" style clamps, which are connected to the tubular by encircling the tubular. Typically, two hinged semi-circular sections are joined together using fasteners (e.g., bolts) at their circumferential ends to form the wrap-around control line clamp. Installation of wrap-around type control line clamps is labor-intensive, however, and requires positioning of the clamp sections around the tubular and attachment of the fasteners to secure the clamp sections by rig personnel standing at close proximity to the wellbore on the rig floor. This area of the rig floor is referred to as the "red zone" and is considered an area of high risk of injury to personnel. Consequently, there is a push within the industry to remove personnel from the red zone in order to provide a safer work environment for rig personnel.

Accordingly, a press-together clamp has been developed that avoids at least some of the manual assembly and installation of the wrap-around clamp. This type of clamp is generally made up of preinstalled rings and a control line retaining component. The rings are pressed axially together during installation. This clamp is more fully described in WO2021/250005, the disclosure of which is incorporated herein by reference to the extent not inconsistent with the present disclosure. The press-together clamp is generally made up of a male ratchet ring, a female ratchet ring, and a control line clamping element ("retention lid"). The male and female ratchet rings are circular, non-segmented rings which are preinstalled around the tubular segments prior to the tubular segments being delivered to the rig floor.

To install the press-together clamp, the retention lid is moved toward the tubular and received around the control line in axial alignment with one or both of the ratchet rings. The male and female ratchet rings are then pressed together. Once fully pressed together, the male and female ratchet rings resist displacement from one another and grip the tubular, so as to resist movement with respect thereto as well. Further, the male and female ratchet rings entrain the retention lid, which in turn holds the control line in position along the tubular string. A series of clamps interspersed along the completion string secure the control lines to the string thus allowing the completion string and control lines to be lowered in unison into the wellbore until the entire completion string including downhole instruments and other production control devices and control lines are in place within the wellbore.

SUMMARY

Embodiments of the disclosure include an installation system for installing a control line clamp onto a tubular string. The system includes a first load plate configured to be positioned at least partially around the tubular string, a second load plate that is axially offset from the first load plate and configured to be positioned at least partially around the tubular string, the first and second load plates being configured to engage a first clamp member and a second clamp member, respectively, positioned on the tubular string, a retention lid positioner configured to receive a retention lid and position the retention lid with respect to the first and second clamp members, so as to couple the retention lid with the first and second clamp members, a sensor system configured to provide feedback signals representing that the first and second load plates are received around the tubular and aligned with a control line, the retention lid is positioned at a target location and aligned with the control line, and the first and second load plates are adducted together to press the first and second clamp members together, and an indication device configured to indicate a state of the installation system based at least in part on the feedback signals provided by the sensor system.

Embodiments of the disclosure also include a method that includes receiving a control line retention lid into a retention lid positioner, moving first and second load plates of a clamp installation system into position around a tubular string and a control line that extends along the tubular string, a first clamp member and a second clamp member being positioned around the tubular and at least partially axially between the first and second load plates, receiving a first feedback signal from a first sensor representing that the first and second load plates have received the tubular string and the control line, in response to receiving the first feedback signal, closing doors of the first and second load plates, such that the first and second load plates circumscribe the tubular string, at least partially in response to receiving the first feedback signal and closing the doors, moving the first load plate axially in a direction toward the second load plate, receiving a second feedback signal representing that the first load plate with the retention lid positioner coupled thereto has reached a target location with respect a first clamp member, at least partially in response to receiving the second feedback signal, stopping movement of the first load plate vertically in a direction toward the second load plate, and moving the retention lid positioner that carries a retention lid toward the tubular, such that the retention lid receives the control line and is positioned at a target location on the tubular string, receiving a third feedback signal representing that that retention lid is positioned at the target position and the control line is received at least partially through the retention lid, and at least partially in response to receiving the third feedback signal, adducting the first and second load plates together such that the first clamp member is pressed into engagement with a second clamp member positioned around the tubular string, and indicating a state of the clamp installation system using an indication device based at least in part on the first, second, and third feedback signals.

The foregoing summary is intended merely to introduce a subset of the features more fully described of the following detailed description. Accordingly, this summary should not be considered limiting.

BRIEF DESCRIPTION OF THE DRAWINGS

The accompanying drawing, which is incorporated in and constitutes a part of this specification, illustrates an embodiment of the present teachings and together with the description, serves to explain the principles of the present teachings. In the figures:

FIGS. 9A and 9B illustrate a two-part actuation sequence of a pipe center sensor, according to an embodiment.

FIGS. 19A and 19B illustrate a side view of the adduction process for the clamp, according to an embodiment.

Figure 1:
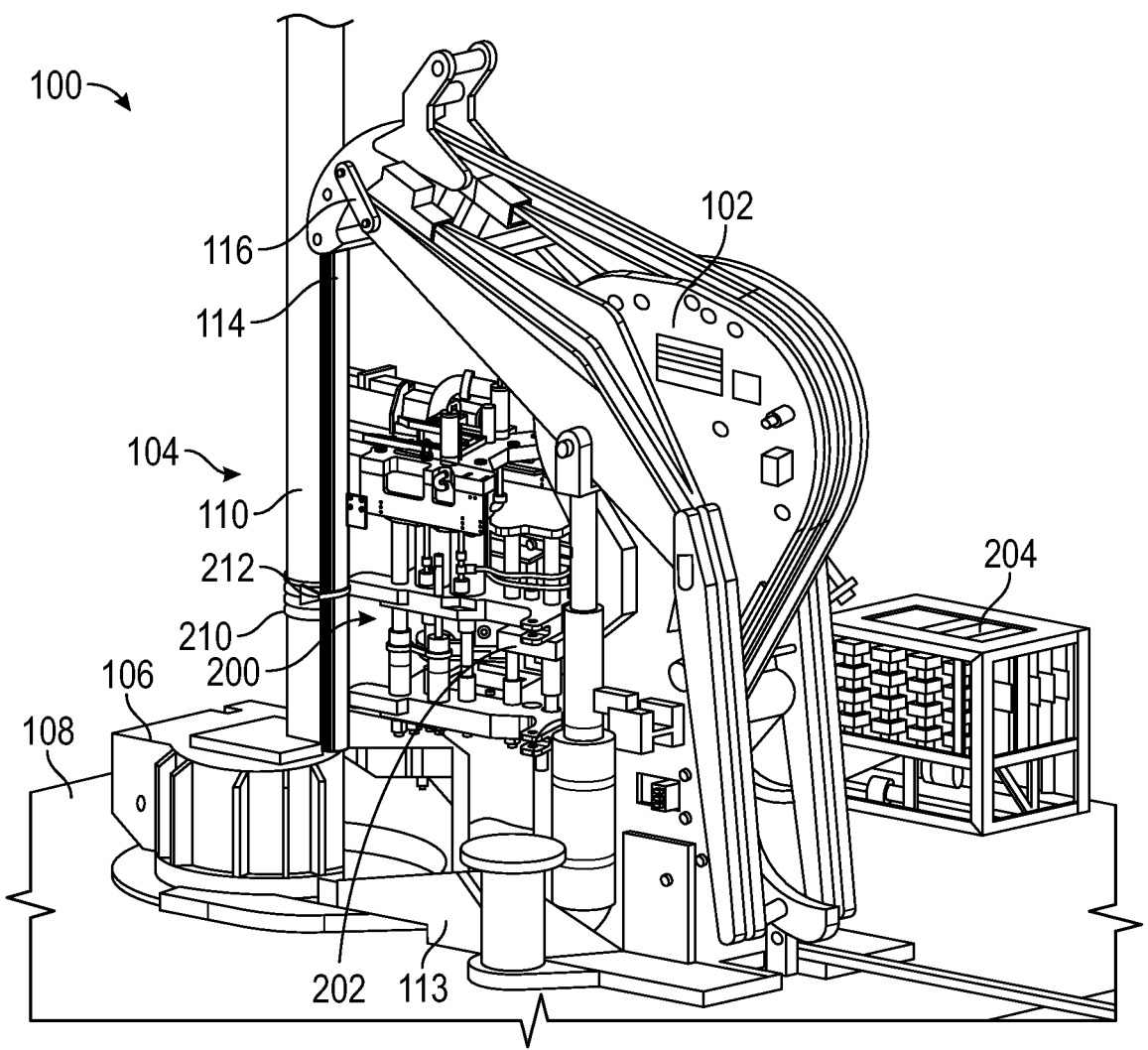
FIG. 1 illustrates a perspective view of a control line installation system, according to an embodiment.

It should be noted that some details of the figure have been simplified and are drawn to facilitate understanding of the embodiments rather than to maintain strict structural accuracy, detail, and scale.

DETAILED DESCRIPTION

Reference will now be made in detail to embodiments of the present teachings, examples of which are illustrated in the accompanying drawing. In the drawings, like reference numerals have been used throughout to designate identical elements, where convenient. The following description is merely a representative example of such teachings.

FIG. 1 illustrates a perspective view of a control line installation system 100, according to an embodiment. The control line installation system 100 generally includes a control line manipulator 102, a control line clamp installation system 104, and a spider 106, which are generally co-located on a rig floor 108 of a drilling rig. The spider 106 may be secured directly to the rig floor 108, and may include slips or other structures that are configured to engage and hold a tubular string 110 in suspension therefrom. Although not shown, an elevator and/or other pipe-handling equipment may be provided on the rig to manipulate an add-on tubular into position above the tubular string 110, and rotate the add-on tubular into connection ("make-up") with the tubular string 110 secured in the spider 106.

Further, in at least some embodiments, the control line installation system 100 may further include a base 113 that is connected directly to the rig floor 108. The control line manipulator 102 and the control line clamp installation system 104 may be connected directly together or connected together via the base 113.

The control line manipulator 102 may guide a control line 114 into proximity and in a parallel orientation to the central axis of the tubular string 110 (generally referred to herein as an "axial direction" or simply "axially"). As discussed above, the control line 114 may be electric, optical, pneumatic, hydraulic, or any other sort of cable that communicates signals of any sort to/from devices secured to the tubular string 110. The control line manipulator 102 may include a distal end 116 that may be movable vertically, pivotally, or in any other desired manner to permit the control line 114 to be brought into position with respect to the tubular string 110 and potentially moved partially away from the tubular string 110, e.g., to permit movement of the add-on tubular into alignment and connection with the rest of the tubular string 110. The control line manipulator 102 may include various rollers (not visible), guides, and other structures to accomplish its function, as will be apparent to one of ordinary skill in the art.

The control line clamp installation system 104 will be described in greater detail below, but at a general level, includes a clamp head 200 made up of two or more frames and a retention lid positioner 202. The clamp head 200 and the retention lid positioner 202 may be movable together laterally and pivotally with respect to the tubular string 110 on the rig floor 108. The clamp installation system 104 also includes a controller 204, which may be configured to receive feedback signals from sensors of the clamp installation system 104 and provide signals to various drivers/actuators so as to control the operation of the clamp installation system 104.

In at least some embodiments, the clamp installation system 104 may also include an indication device, one example of which is shown in and described below with reference to FIG. 20. The indication device may, for example, visually display the feedback that has been received. In other embodiments, the indication device may be part of a digital display (e.g., shown on a computer screen), or may be part of a processor which receives the indications (feedback signals) from the various sensors of the control line clamp installation system 104.

The controller 204 may be configured to implement a manual control, a semi-automatic control, or a fully-automatic control of the clamp installation system 104. For example, in some embodiments, the controller 204 may respond to manual inputs from a user, and in response, send signals to drivers/actuators and provide feedback (e.g., via the indicator device) to the rig personnel, e.g., indicating when a given step is complete. In a semi-automatic process, the controller 204 may enforce interlock rules that prevent the system 104 from proceeding to a step until certain precursor processes are verified as complete by sensor feedback. Thus, the controller 204 may enforce the order of the process and ensure that each step in the process is fully complete before a next step is permitted to proceed. In a fully-automatic implementation, the controller 104 may receive an initiation signal (e.g., from a button or another signal/input) to begin a clamp installation procedure, and may advance through the installation procedure without human interaction. In any of these implementations, the need for rig personnel in the red zone may be mitigated or eliminated.

The clamp installation system 104 may be configured to install a press-together clamp 210 onto the tubular string 110. For example, the clamp head 200 may be configured to adduct first and second ratchet rings of the clamp 210 together, while the retention lid positioner 202 delivers a retention lid 212 to the clamp 210 during the installation process. The retention lid 212 serves to hold the control line 114 close to the tubular string 110 and prevent radial and circumferential displacement of the control line 114 along the tubular string 110 during deployment into the well.

Figure 2:
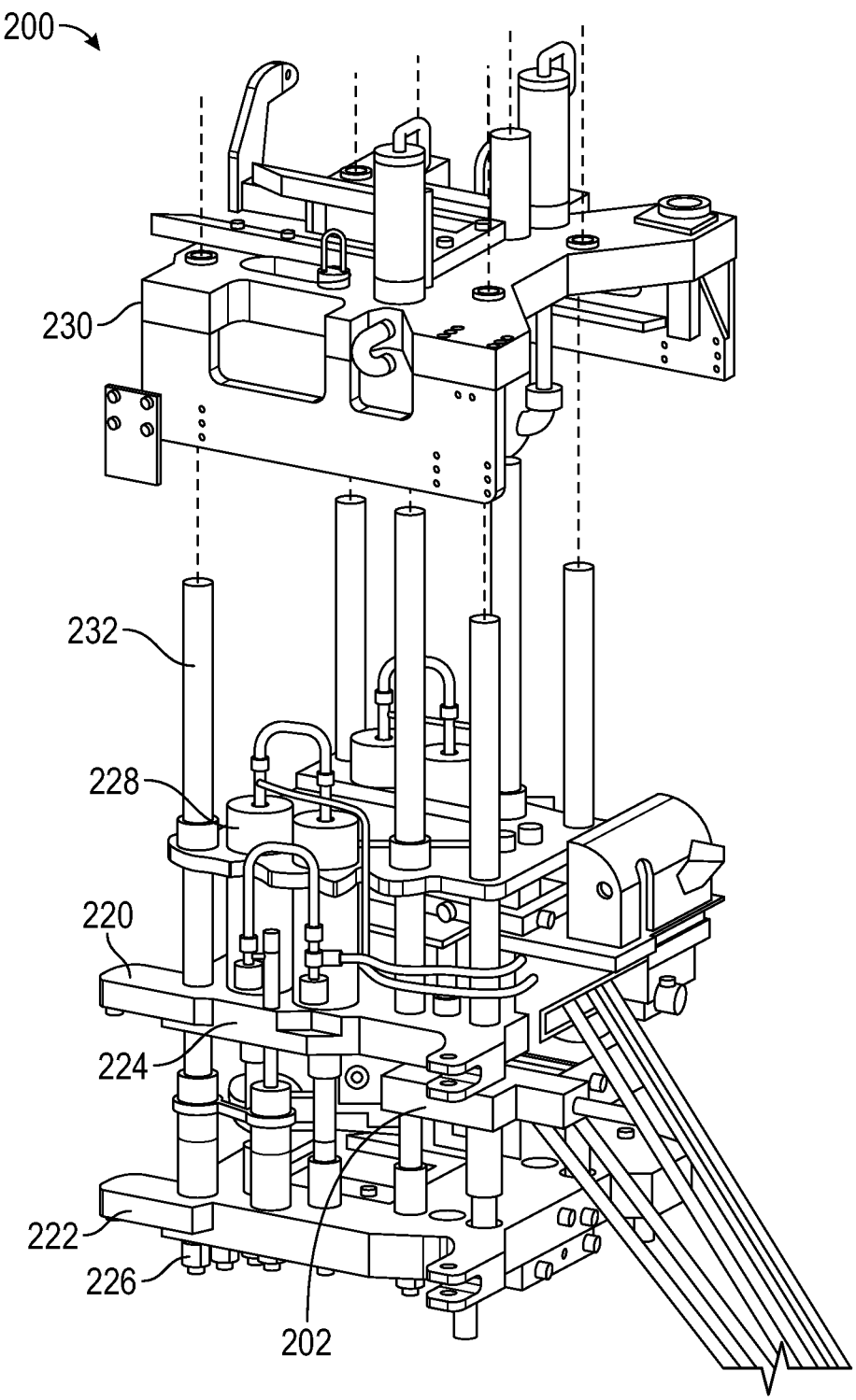
FIG. 2 illustrates an enlarged, partially exploded, perspective view of the clamp head of the control line clamp installation system, according to an embodiment.

FIG. 2 illustrates an enlarged, partially exploded, perspective view of the clamp head 200 of the control line clamp installation system 104, according to an embodiment. In the illustrated embodiment, the clamp head 200 includes an upper frame 220 and a lower frame 222. In particular, the upper frame 220 may include a first load plate 224 and the lower frame 222 may include a second load plate 226. In at least some embodiments, the first and second load plates 224, 226 may be offset vertically from one another, that is, in a direction that coincides with the axis of the tubular 110 of FIG. 1. The retention lid positioner 202 may be located between the first and second load plates 224, 226.

The frames 220, 222, including the first and second plates 224, 226 may be relatively movable in the vertical direction. Specifically, in this embodiment, the first load plate 224 may be driven toward the second load plate 226. One or more drivers 228, in this case, hydraulic cylinders, may adduct the first and second load plates 224, 226. In at least some embodiments, the first load plate 224 moves vertically along with the upper frame 220, e.g., toward or away from the second load plate 226, although, as will be described in greater detail below, a relatively small range of movement may be permitted between the first plate 224 and the upper frame 220.

The clamp head 200 may also include a hanger frame 230. The upper and lower frames 220, 222 may be suspended from the hanger frame 230 and may be movable with respect thereto, e.g., along rods 232 extending therebetween. The hanger frame 230 may provide a connection between the clamp head 200 and the remainder of the system 100, and may permit movement of the clamp head 200 relative to the rig floor 108 of FIG. 1 and/or the manipulator 102 of FIG. 1.

Figure 3:
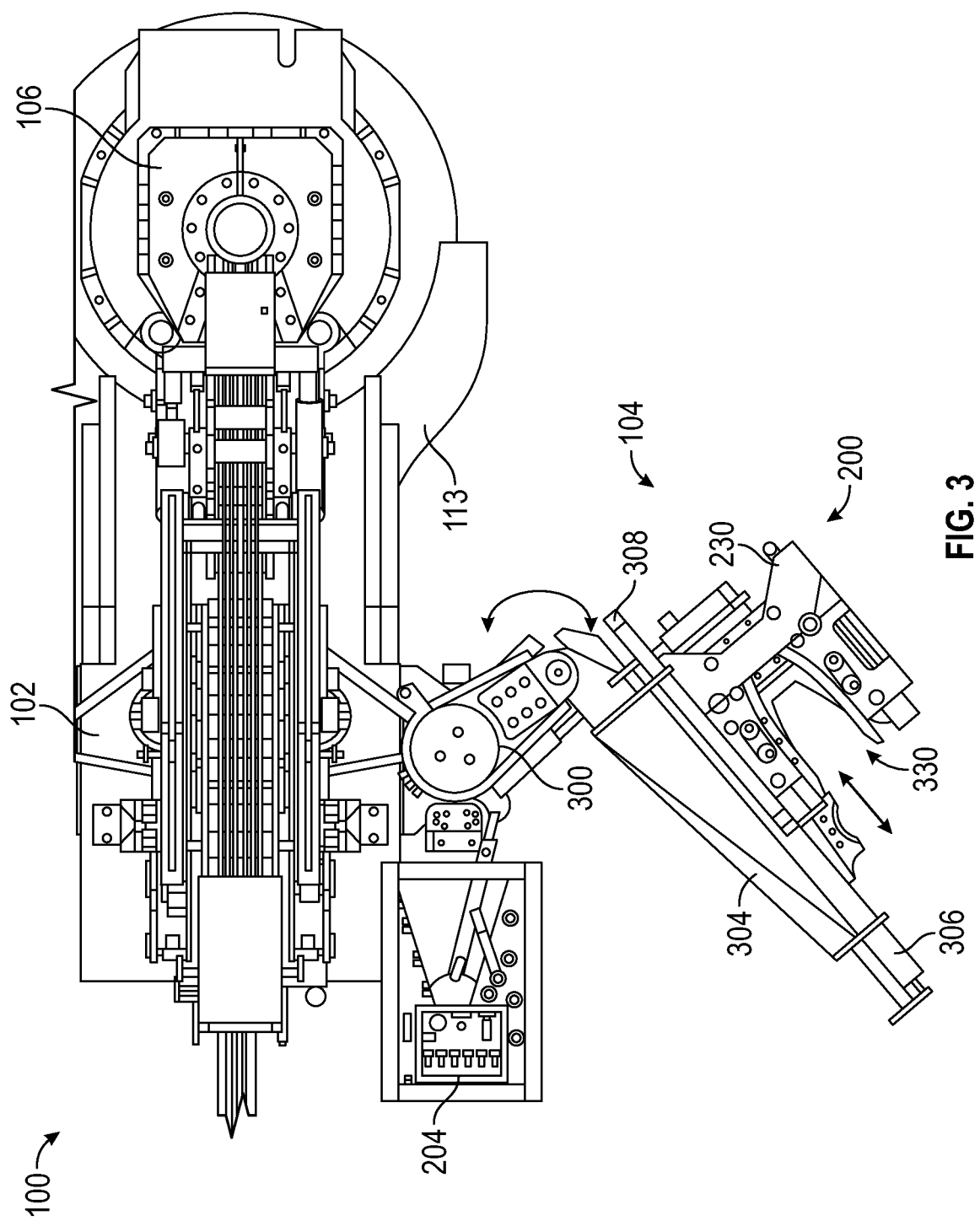
FIG. 3 illustrates a top plan view of the control line installation system, according to an embodiment.

FIG. 3 illustrates a top plan view of the control line installation system 100 in a first position, in which the clamp installation system 104 is generally rotated away from the tubular string 110, as indicated by the curved, dashed arrows, according to an embodiment. It will be appreciated that "position" as the term is used herein refers to a position of relatively movable components, with a change in position referring to a movement but not necessarily a redesign of the components. As shown, the system 100 may generally include a pivotal connection 300 between the clamp installation system 104 and the base 113. As such, the clamp installation system 104 can be rotated away from proximity to the tubular string 110, which may provide a convenient "loading" position for a retention lid, as will be discussed below.

As can also be seen in this view, the clamp installation system 104 may, in addition to being connected via pivotal connection 300, may also be connected to the base 113 by a laterally-movable connection. Specifically, in an embodiment, the clamp installation system 104 may include an arm 304 with a rail 306 extending along the arm 304. The clamp installation system 104, specifically the hanger frame 230, may be configured to travel along the rail 306, e.g., via a driver, e.g., a linear actuator 308 such as a hydraulic cylinder, as indicated by the dashed arrow.

As is visible generally in this view, the clamp head 200 has a lateral opening or "throat" 330. More particularly, each of the upper, lower, and hanging frames 220, 222, 230 has an open lateral side, which are all in alignment. Further, each of the first and second load plates 224, 226 has an open lateral side. The open lateral sides in alignment provides the throat 330, which is configured to receive the tubular string 110 laterally therein by moving the clamp head 200 laterally to a position that is at least partially around the tubular string 110, as will be described in greater detail below.

Figure 4:
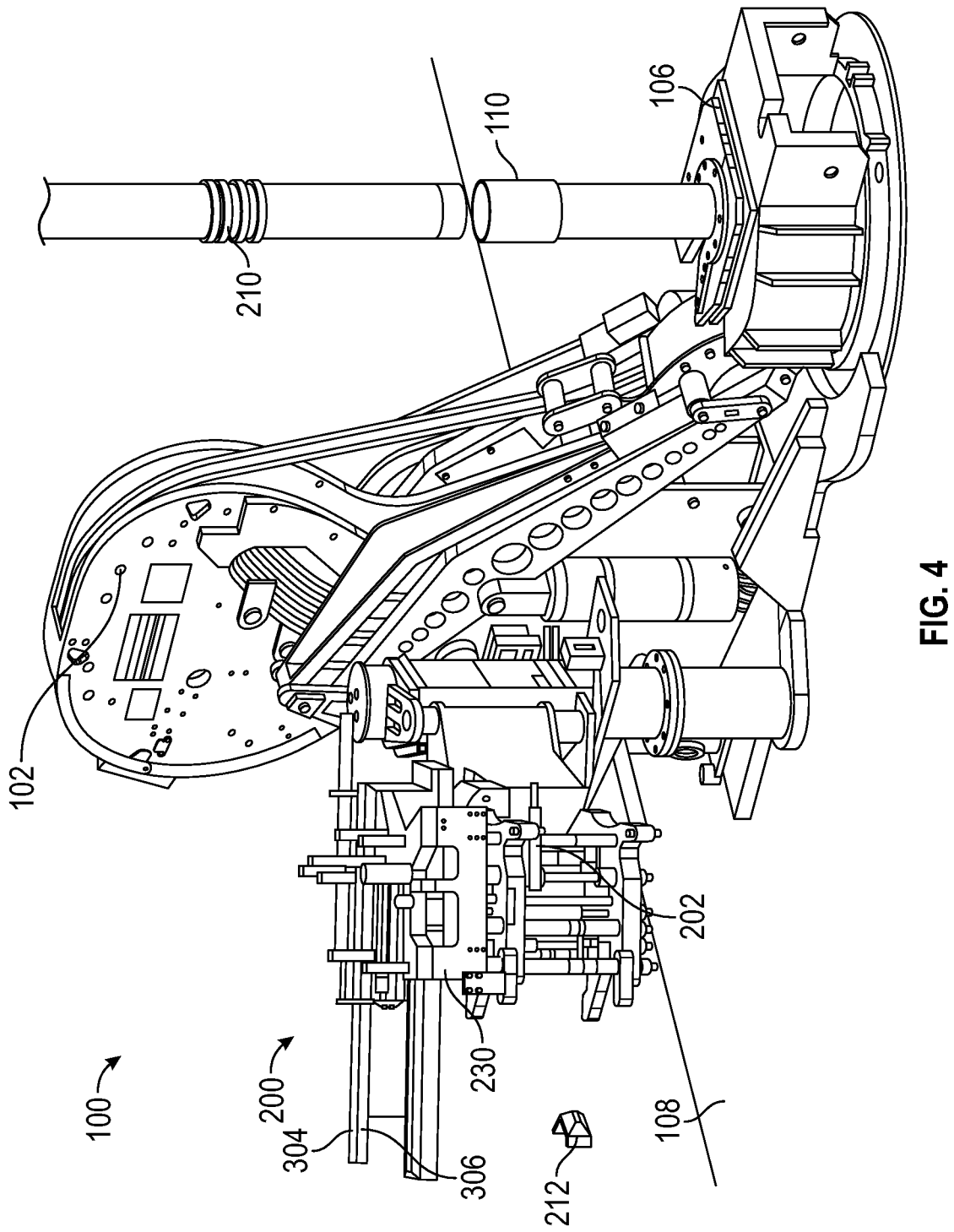
FIG. 4 illustrates a perspective view of the control line installation system, according to an embodiment

FIG. 4 illustrates a perspective view of the control line installation system 100 in the first position, according to an embodiment. In this view, the retention lid 212 is shown being loaded into the retention lid positioner 202. It will be appreciated that the control line installation system 100 in the first position may generally provide a safest position for a rig operator to approach and interact with the clamp installation system 104 on the rig floor 108. As shown, in this position, the clamp head 200 may be disposed in a retracted position along the arm 304, e.g., such that the clamp head 200 is closest to the pivot point of the arm 304. In some embodiments, the clamp head 200 may be extended to receive the retention lid 212, e.g., toward a distal end of the arm 304, farthest away from the pivot point.

Figure 5:
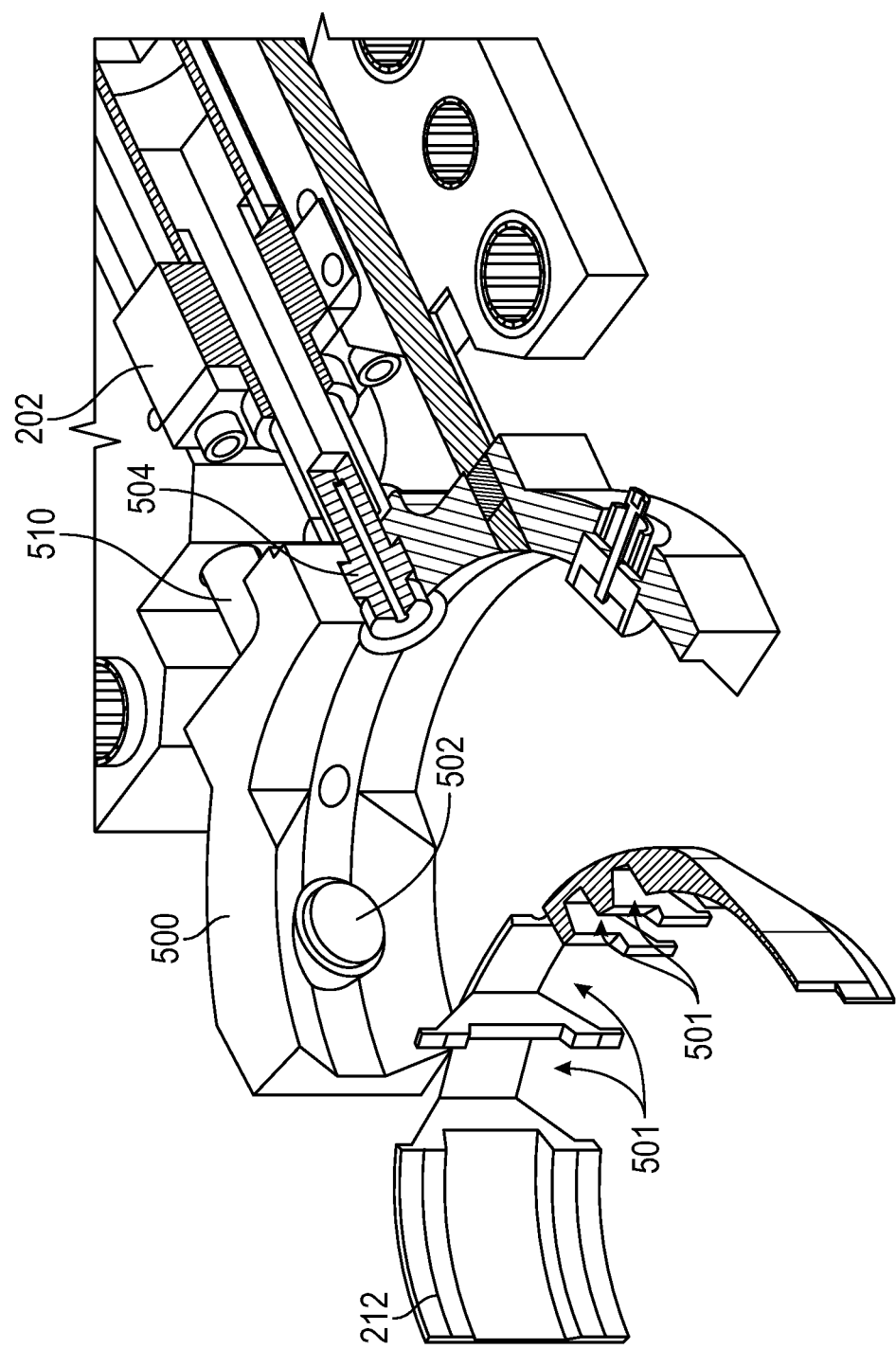
FIG. 5 illustrates an enlarged, partial sectional view of a retention lid positioner receiving a retention lid, according to an embodiment.

FIG. 5 illustrates an enlarged, partial sectional view of the retention lid positioner 202 receiving the retention lid 212 at least partially therein, according to an embodiment. As shown, the retention lid 212 may be generally arcuate in shape and may define one or more guide slots (four shown) 501 for receiving one or more control lines therethrough. The retention lid positioner 202 may include a receiver 500 that engages and retains the retention lid 212. The receiver 500 may be generally arcuate and formed to complement the shape of the retention lid 212. For example, the receiver 500 may include one or more retention devices 502, which may be magnets. Additionally, the receiver 500 may include an alignment device, such as an indexing pin 504, which may fit into an alignment groove (or another type of alignment feature) of the retention lid 212. The indexing pin 504 may mate with the alignment groove to ensure a rotational alignment of the arcuate retention lid 212 in the receiver 500.

The retention lid positioner 202 may also include a driver, in this embodiment, a linear actuator 510 such as a hydraulic cylinder. The retention lid positioner 202 may thus be extendable in a direction that is perpendicular to the tubular string 110, e.g., "laterally" with respect to the tubular string 110.

In at least some embodiments, the retention lid positioner 202 may include a sensor that senses when the retention lid 212 is correctly positioned therein. For example, the indexing pin 504 and/or the retention devices 502 may include position sensors, proximity switches, encoders, magnetic sensors, etc., that are capable of providing a feedback signal to the controller 204 representing that the retention lid 212 is positioned in the receiver 500 and correctly aligned for deployment. In other embodiments, such a sensor may be omitted.

Figure 6:
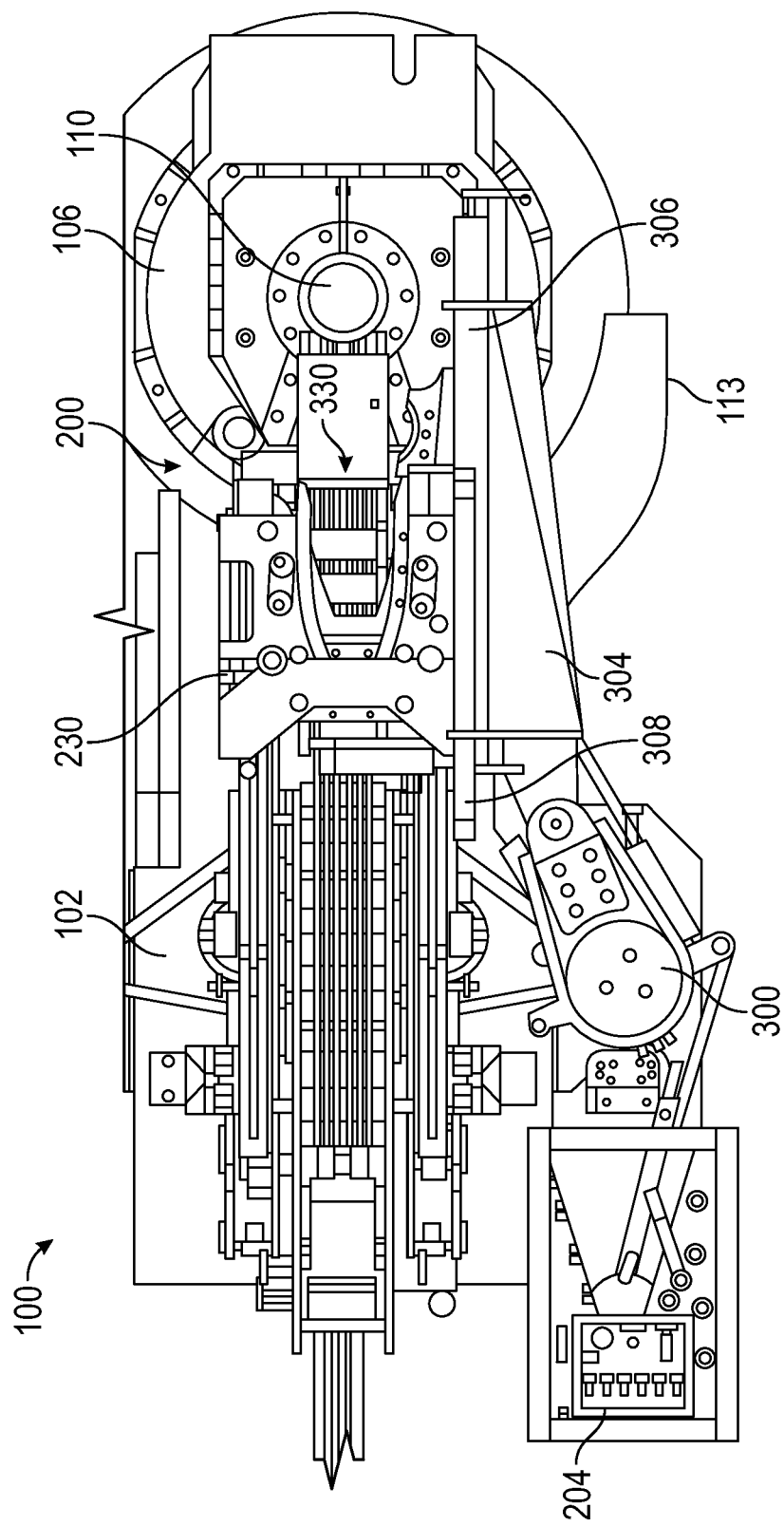
FIG. 6 illustrates a top plan view of the control line installation, according to an embodiment.

FIG. 6 illustrates a top plan view of the control line installation system 100 in an intermediate position, according to an embodiment. In this position, the arm 304 has been pivoted so that the clamp head 200 is swung into alignment with the tubular string 110. However, the clamp head 200 may still be in its retracted position, such that it is ready to be extended and laterally receive the tubular string 110 into the throat 330.

Figure 7A:
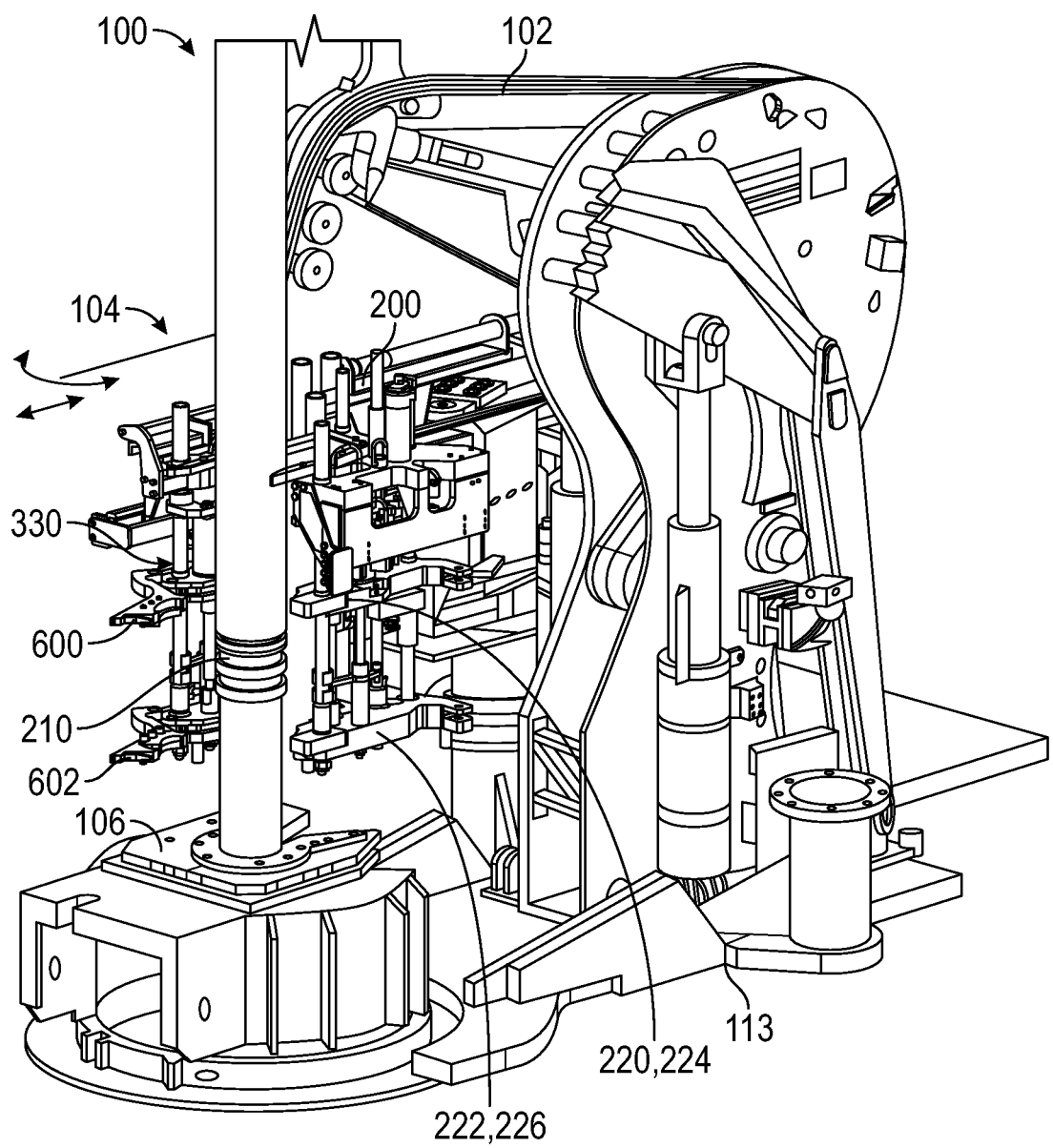
FIG. 7A illustrates a perspective view of the clamp head at a "rough center" position, according to an embodiment.
Figure 7B:
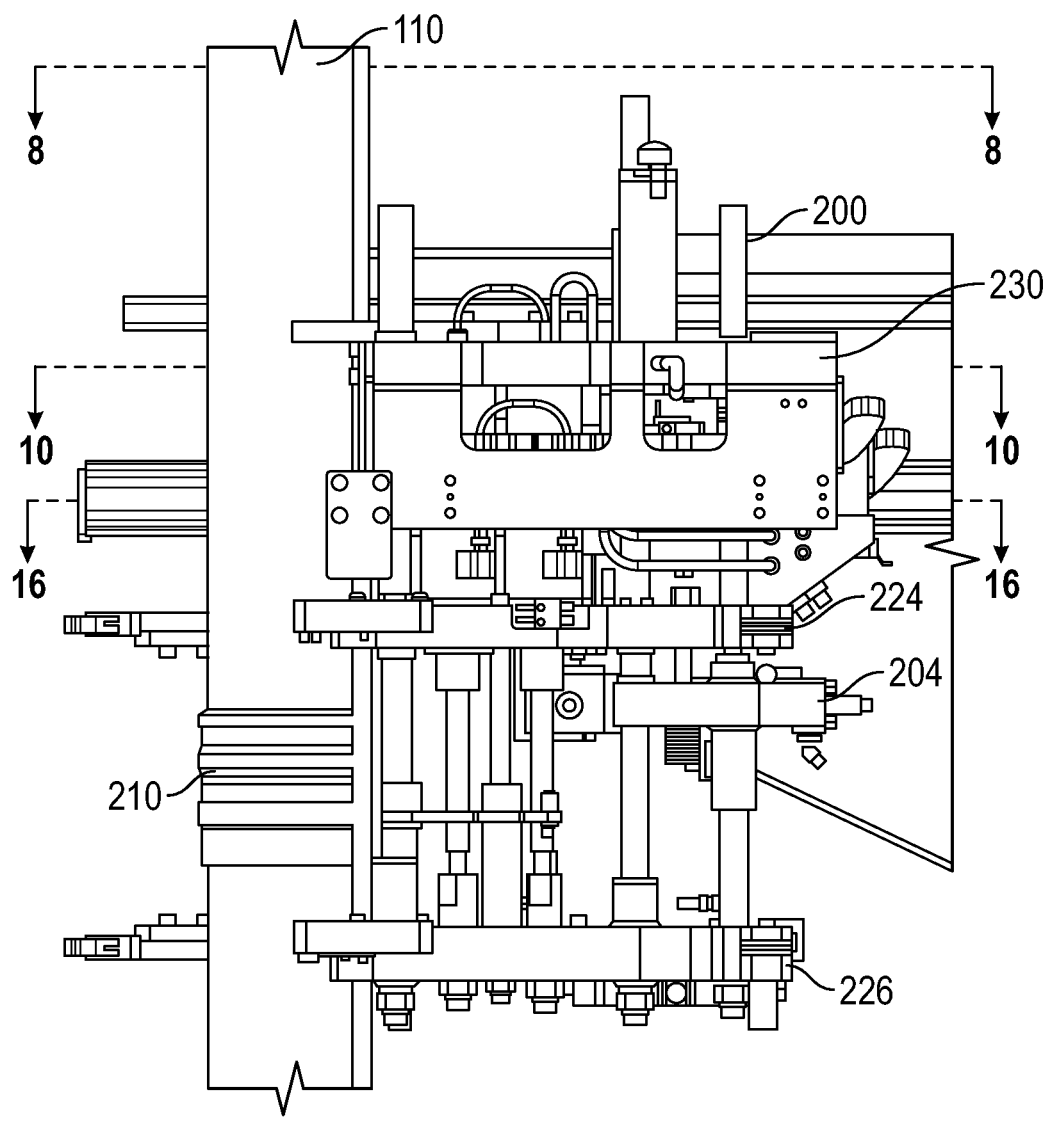
FIG. 7B illustrates a side elevation view of the clamp head at the rough center position, according to an embodiment.

FIG. 7A illustrates a perspective view of the clamp head 200 at a "rough center" position (or position), according to an embodiment, after the clamp head 200 has been moved laterally to a position at least partially around the tubular string 110. FIG. 7B illustrates a side elevation view of the clamp head 200 at the rough center position, according to an embodiment. In both FIGS. 7A and 7B, part of the structure has been omitted from view to permit illustration of the interior of the clamp head 200. Referring to both FIGS. 7A and 7B, as shown, the clamp head 200 has been moved laterally along the arm 304, such that the tubular string 110 has been received into the throat 330. The clamp 210, which may not yet be fully installed, but merely positioned around the tubular string 110 may be positioned between the upper and lower frames 220, 222, and more particularly, axially between the first and second plates 224, 226. Further, as shown, each of the first and second frames 220, 222 includes a door 600, 602, which in this position, is open to permit lateral entry of the tubular string 110 into the throat 330.

Figure 8:
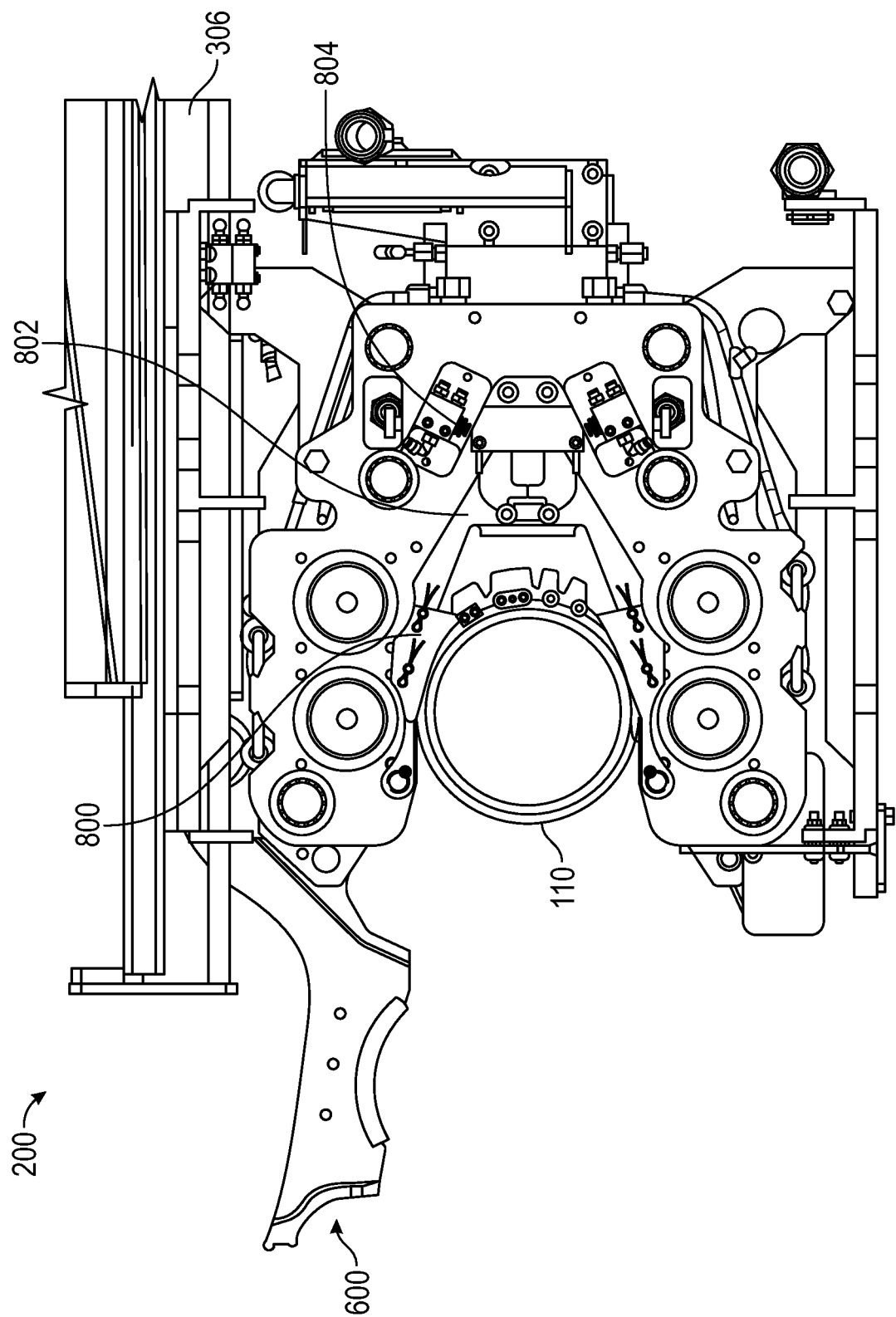
FIG. 8 illustrates a top view of the clamp head, in particular, showing the hanger frame 230, according to an embodiment.

As the tubular string 110 is received laterally into the clamp head 200, the clamp head 200 may sense the arrival of the tubular string 110 at a center position therein. For example, FIG. 8 illustrates a top view of the clamp head 200, in particular, showing the hanger frame 230. This view is taken along line 8-8 in FIG. 7B. The hanger frame 230 may include a pipe center sensor, which may be made up of several mechanical components, as described herein. In other embodiments, other types of electronic, pneumatic, magnetic, optical, etc., sensors may be used instead of in lieu of a proximity switch.

In this embodiment, the pipe center sensor includes a pair of cams 800, a pair of spring-biased arms 802, and a pair of contact sensors (or "contacts") 804. When the tubular string 110 is not fully received into the clamp head 200, e.g., as a default, the arms 802 may be spaced apart from the contacts 804. Further, the cams 800 may be slidable within slots formed in the hanger frame 230, and may be wedge-shaped, such that the cams 800 are pressed outward by the tubular string 110 being received therein. The cams 800 may be connected to the arms 802, such that the outward movement thereof is transmitted to the arms 802, eventually causing the arms 802 to swing outward and contact the contacts 804. This may provide the feedback signal representing that the tubular string 110 has arrived at center.

FIGS. 9A and 9B further illustrate this two-part actuation of the pipe center sensor, according to an embodiment. In the default position, shown in FIG. 9A, the cam 800 is at a radial inward position, and the arm 802 is spaced apart from the contact 804. Advancing to FIG. 9B by receipt of the tubular string 110, the cam 800 is pressed radially outwards (generally upward in this view). When the tubular string 110 reaches the center position, the cam 800 drives the arm 802 into the contact 804, thereby producing the signal representing that the tubular string 110 is at center (or, equivalently, that the clamp head 200 has been extended into position around the tubular string 110). In some embodiments, the cams 800 may also serve the purpose of guiding the clamp head 200 onto the tubular string 110, ensuring that it is as center, in addition to sensing when it is at center. In some embodiments, other guides, arms, etc. may also be provided to guide the clamp head 200 into position.

Figure 10:
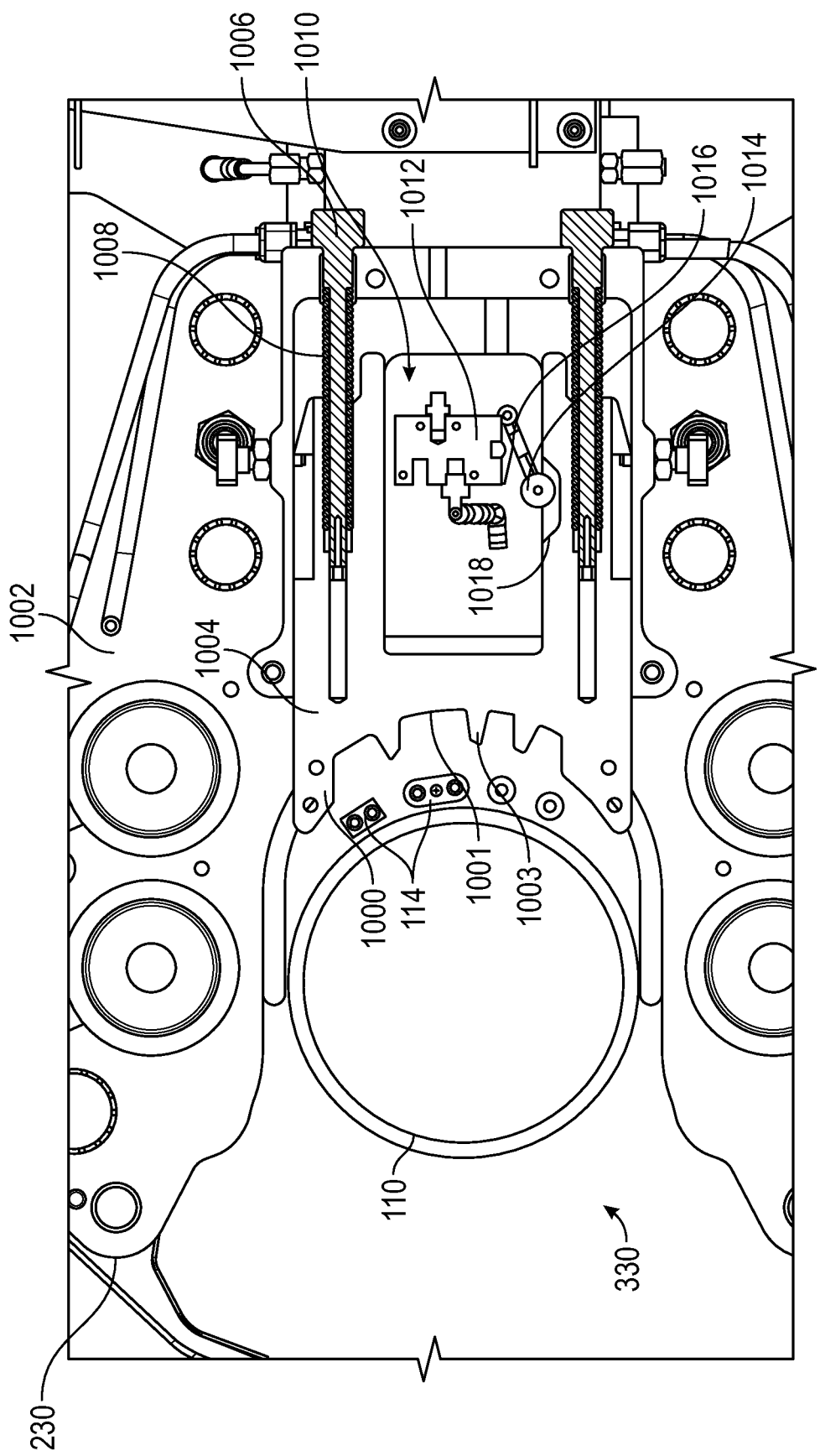
FIG. 10 illustrates a sectional view of the hanger frame, according to an embodiment.

Referring again to FIG. 7B, line 10-10 indicates the viewing plane of FIG. 10. Specifically, FIG. 10 illustrates a sectional view of the hanger frame 230, according to an embodiment. In particular, the hanger frame 230 may include a control line guide sensor that is configured to produce a feedback signal representing that the tubular string 110 has arrived at center and the control line 114 is aligned within a control line guide 1000, which may be axially adjacent to the first load plate 224 (e.g., FIG. 7B). Another control line guide may also be positioned adjacent to the second load plate 226 (e.g., FIG. 7B). The control line guide 1000 includes grooves 1001 to receive the control line 114 and partitions 1003 between the grooves 1001 (e.g., similar to a comb). The control line guide 1000 may be selected to accommodate the particular arrangement of control lines 114, e.g., of varying thickness, shape, etc. Further, the control line guide 1000 may be positioned such that, when properly aligned, the control line 114 is entrained between the tubular string 110 and the hanger frame 230.

The control line guide sensor may be configured to sense whether the control line 114 is pinched or otherwise not in position within the control line guide 1000. For example, the hanger frame 230 may include a base plate 1002 and a sliding receiver 1004 connected thereto. The control line guide 1000 may be disposed at a lateral end of the sliding receiver 1004 and may face the throat 330.

The sliding receiver 1004 may be configured to slide laterally, in the direction toward and away from the tubular string 110 (left and right in this view). The sliding receiver 1004 may be biased laterally toward the tubular string 110, such that the tubular string 110 presses the sliding receiver 1004 laterally in order to reach the center position. For example, the sliding receiver 1004 may be coupled with one or more rods 1006, with springs 1008 coupled thereto, providing the biasing force on the sliding receiver 1004.

The control line guide sensor may also include a sensor assembly 1010 that is configured to detect a position of the sliding receiver 1004. The sensor assembly 1010 may be any type of sensor, e.g., a linear position sensor, proximity switch, magnetic or optical sensor, etc. In this specific, illustrated embodiment, a pneumatic valve assembly provides the sensor assembly 1010. In particular, a valve 1012 is coupled to a roller 1014 via an arm 1016. The arm 1016 is pivotally coupled to the valve 1012 such that angularly displacing the arm 1016 actuates the valve 1012 between the open and closed positions. The sliding receiver 1004 may also include a groove 1018, which may be positioned to receive the roller 1014.

Figure 11A:
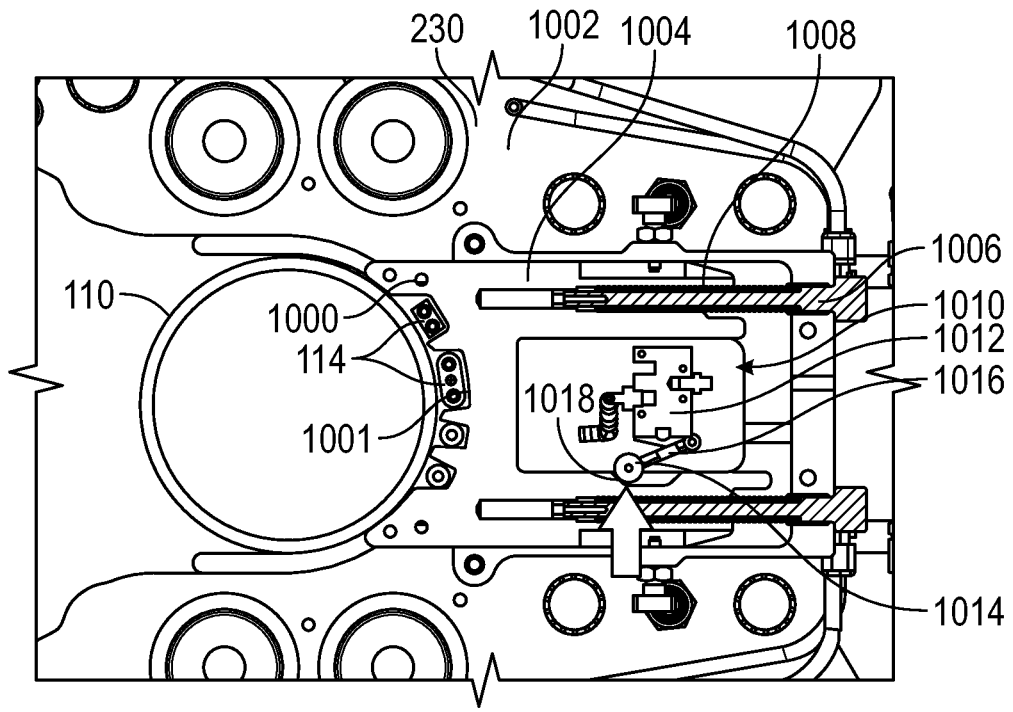
FIG. 11A illustrates a top, plan view of the hanger frame with a control line properly aligned in grooves of a control line guide, according to an embodiment.

In a default position, e.g., by application of the biasing force, the roller 1014 may be positioned in the groove 1018, e.g., corresponding to the valve 1012 being closed. When the tubular string 110 is at center and the control line 114 is properly aligned in the grooves 1001 of the control line guide 1000, as shown in FIG. 11A, the roller 1014 may shift, but remain within the groove 1018, such that the valve 1012 remains closed.

Figure 11B:
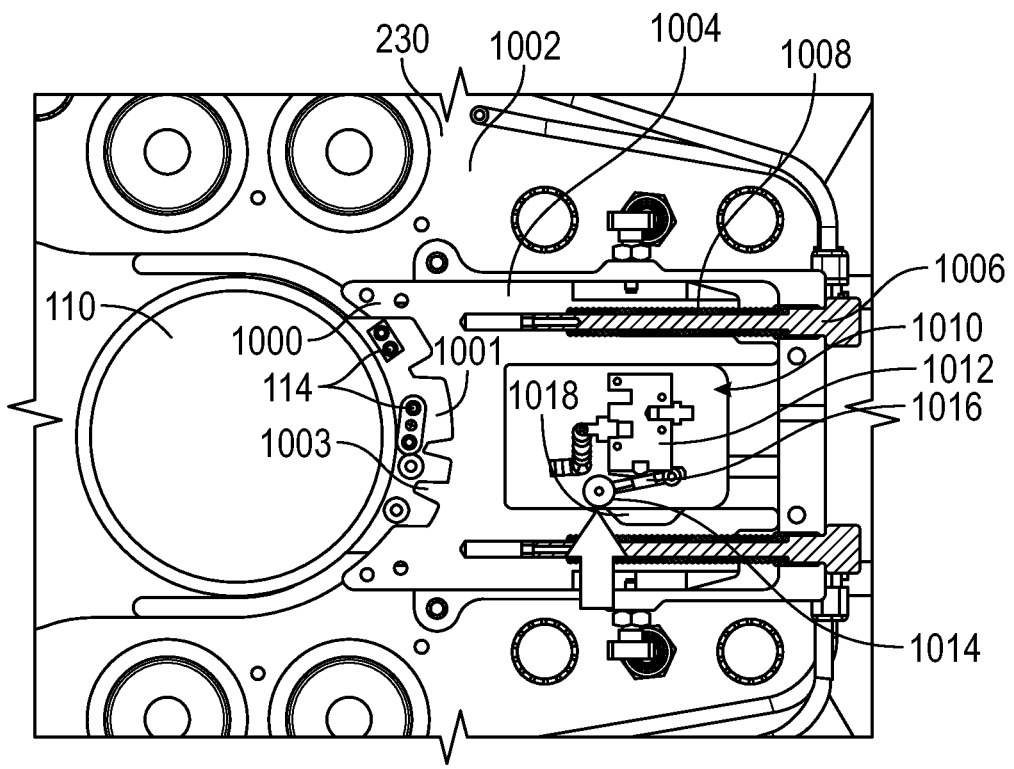
FIG. 11B illustrates a top, plan view of the hanger frame with the control line pinched between partitions and the control line guide and the tubular string 110, according to an embodiment.

However, if the control line 114 is pinched between the partitions 1003 and the control line guide 1000 and the tubular string 110, as shown in FIG. 11B, it may cause the sliding receiver 1004 to shift farther to the right (away from the center position). As a result, the roller 1014 may come out of the groove 1018, thereby changing the orientation of the arm 1016, and causing the valve 1012 to open. This may provide a feedback signal representing that the control line 114 is not properly aligned, and the installation process may be halted. If the valve 1012 is not actuated, it may be a feedback signal representing that the control line 114 is properly aligned, and the installation process may proceed.

Figure 12:
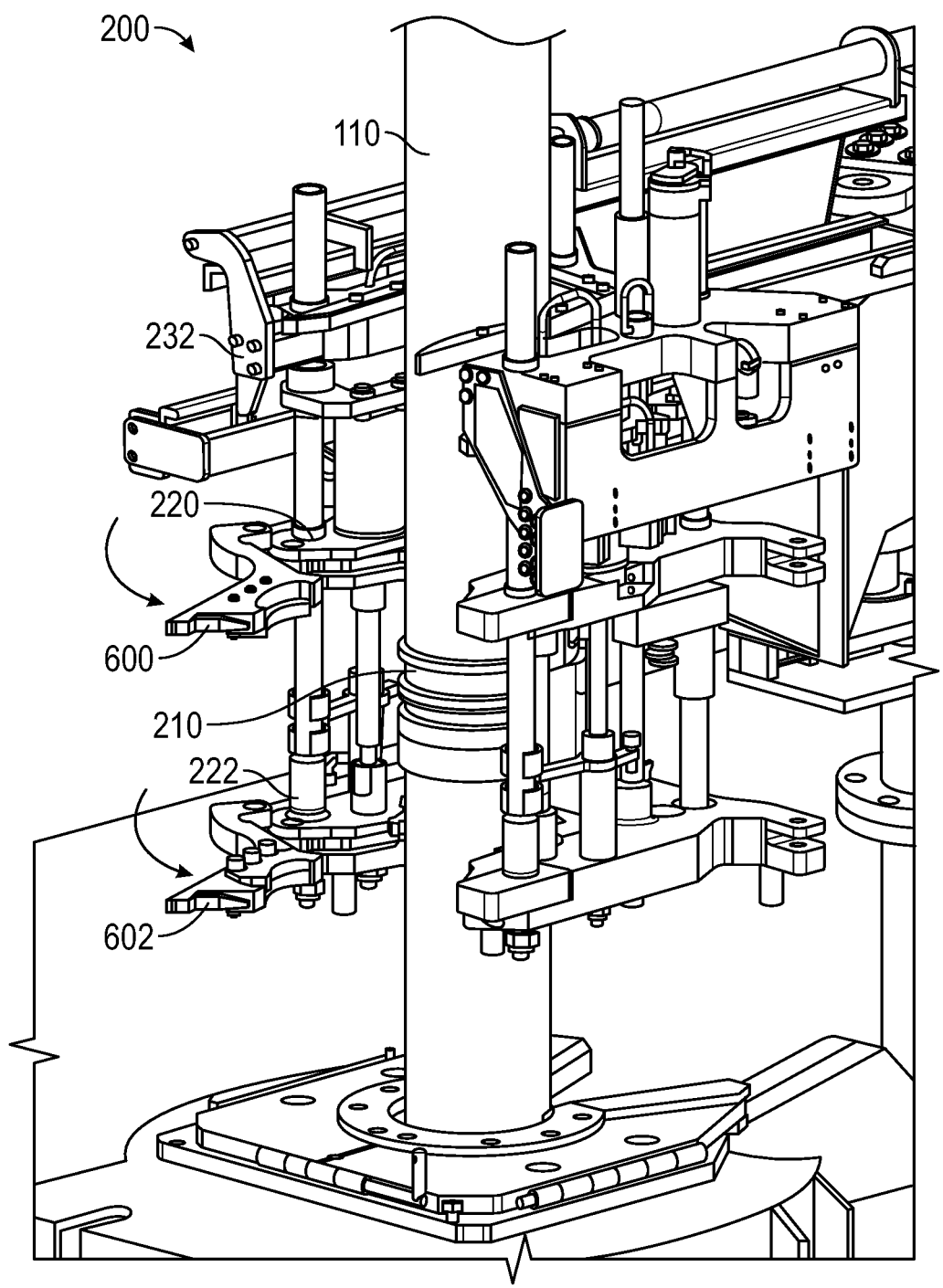
FIG. 12 illustrates a perspective view of the clamp installation system with the clamp head concentrically aligned with the tubular string at the well center position, according to an embodiment
Figure 13:
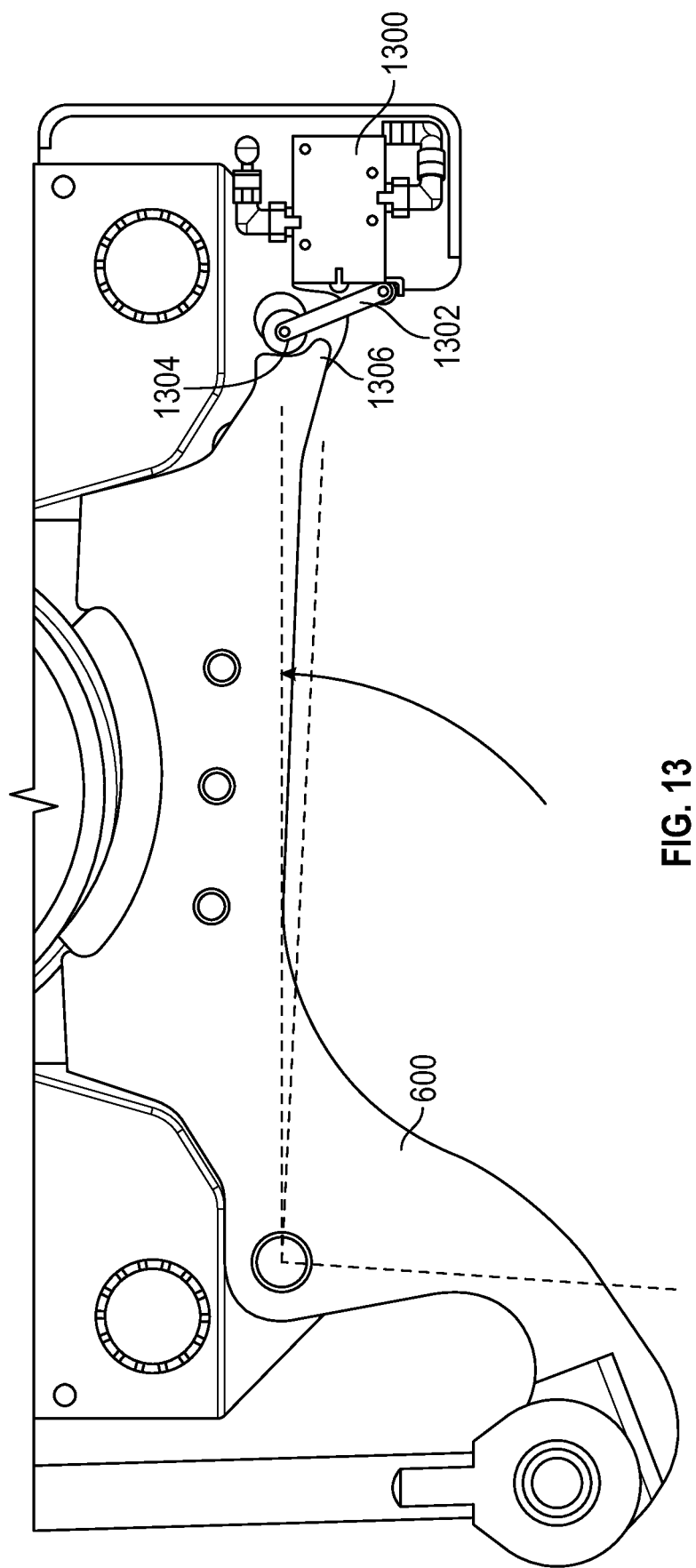
FIG. 13 illustrates a top plan view of a door sensor, according to an embodiment.

FIG. 12 illustrates a perspective view of the clamp installation system 104 with the tubular string 110 now arrived at the center position, according to an embodiment. The doors 600, 602 of the upper and lower frames 220, 222 may now be closed, securing the clamp head 200 around the tubular string 110. As shown in FIG. 13, for example, door sensors may be provided to ensure proper closure of the doors 600, 602. In particular, a valve 1300 may be coupled to a roller 1304 via an arm 1302. When the door 600 (the door 602 may operate similarly) is closed, the roller 1304 may engage a protrusion 1308 of the door 600, which displaces the roller 1304 and thus the arm 1302, thereby actuating the valve 1300. Actuating the valve 1300 may produce a feedback signal (e.g., a pneumatic signal) representing that the door 600 is fully closed. It will be appreciated that any suitable sensor could be used to provide this function, e.g., an electrical switch, magnetic sensor, optical sensor, etc. The control line installation process may be permitted to proceed once the door-closed feedback signal is received. The system 104 may include a door actuator (or "driver") 1310 which may pivot the door 600 open and closed.

Further, as can be seen in FIG. 12, at this point in the process, the upper and lower frames 220, 222 are positioned on either axial side of the clamp 210. Specifically, the upper and lower frames 220, 222 may be spaced apart therefrom.

Figure 14A:
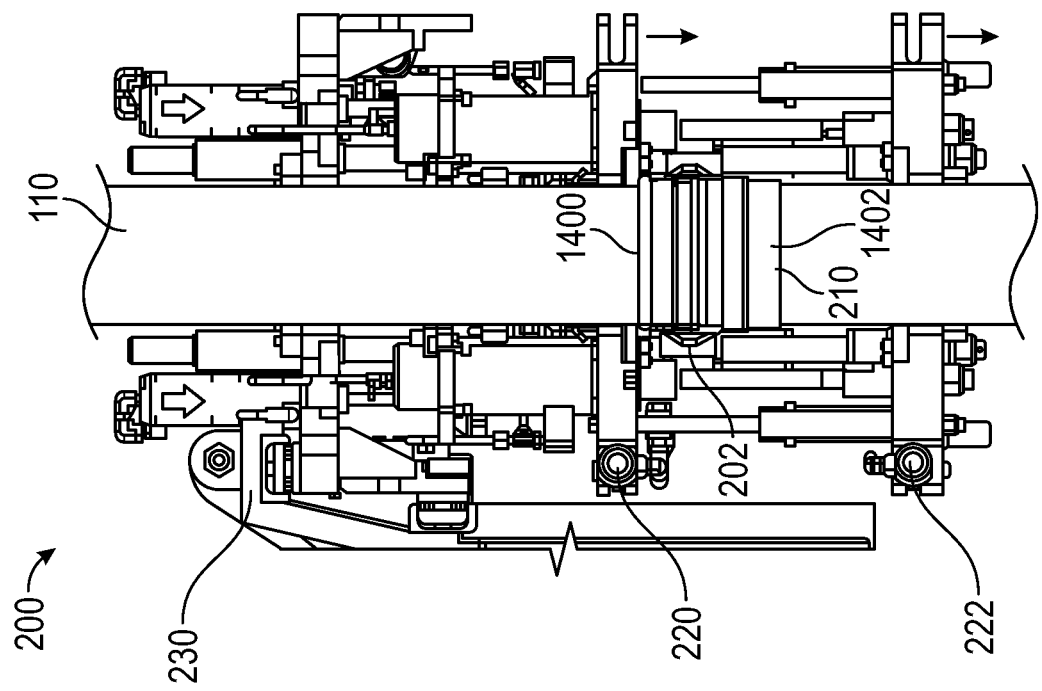
FIGS. 14A and 14B illustrate side views of the clamp head, as the clamp head is axially positioned along the tubular string, according to an embodiment.
Figure 14B:
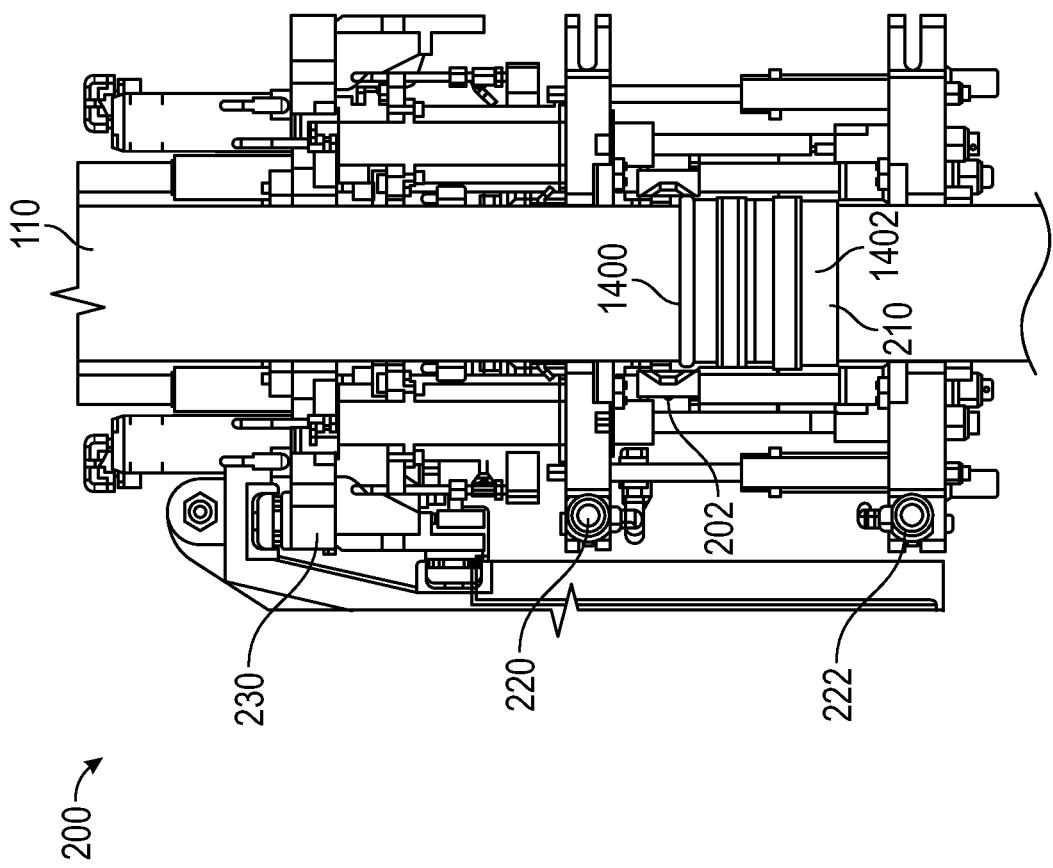

Next, the upper and lower frames 220, 222 may be positioned axially with respect to the clamp 210 (specifically, the clamp members 1400, 1402). FIGS. 14A and 14B illustrate side views of the clamp head 200, according to an embodiment, as the clamp head 200 is axially positioned along the tubular string 110. Specifically, the upper and lower frames 220, 222 may be lowered together (e.g., without adducting the frames 220, 222 together at this time) until the upper load plate 224 engages a first (e.g., male) clamp member 1400 of the clamp 210. The upper and lower frames 220, 222 may be lowered by an actuator (e.g., extending a cylinder) that connects the upper and lower frames 220, 222 to the hanger frame 230.

The engagement between the upper plate 224 and the upper end of the first clamp member 1400 may provide a reference position for the clamp head 200, as there may be a relatively small target area for the retention lid 212 to be installed, as will be described in greater detail below. FIG. 14B in particular illustrates the upper plate 220 having landed on (e.g., engaged) the first clamp member 1400. The lower plate 226 is positioned vertically below (in this view) a second (e.g., female) clamp member 1402, which is configured to receive the first clamp member 1400 so as to grip tubular 110.

Figure 15:
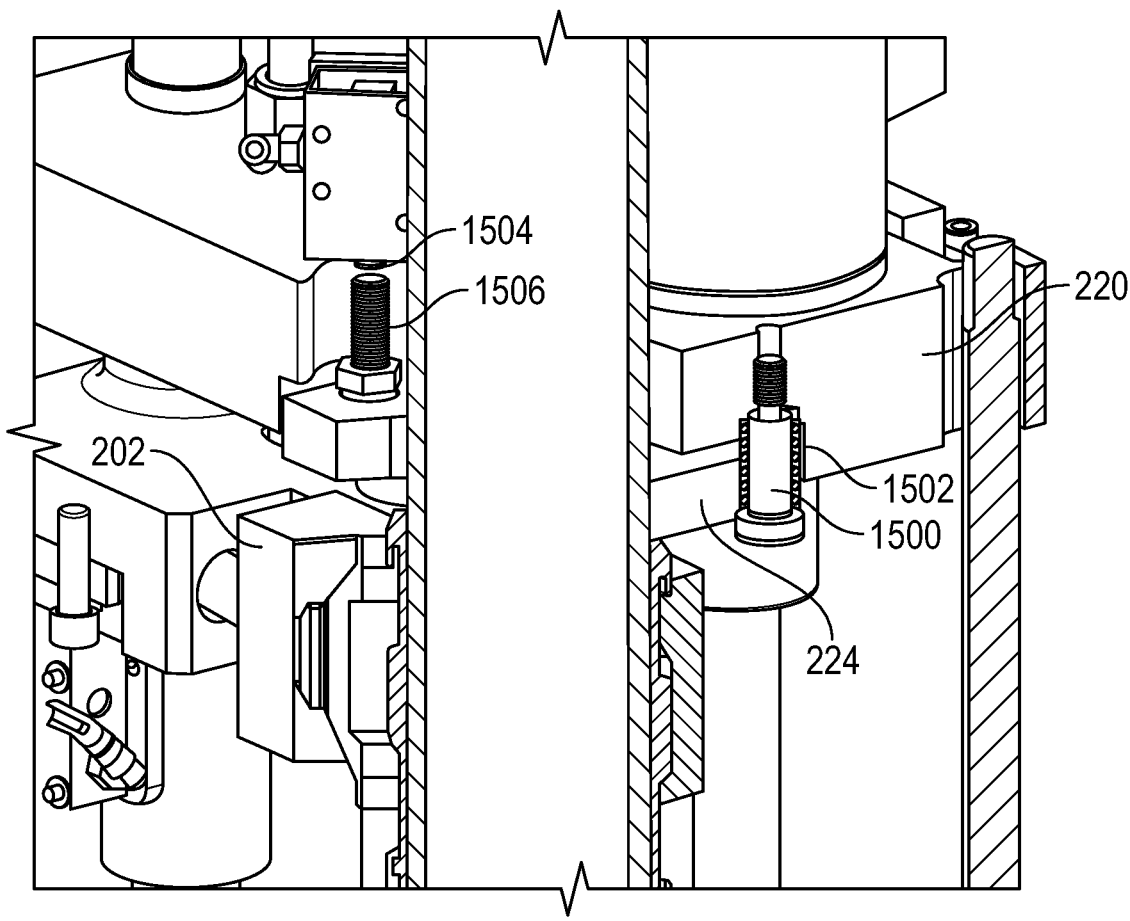
FIG. 15 illustrates a perspective view of a portion of the upper frame and a sensor configured to detect when the upper load plate has landed on a first clamp member, according to an embodiment.

The clamp head 200 may include a sensor for determining that the upper plate 220 has landed on the first clamp member 1400 (e.g., the position of FIG. 14B). For example, in FIG. 15, the upper frame 220 is shown, including the upper plate 224 coupled thereto. The upper plate 224 may be movable with respect to the remainder of the upper frame 220, and may be biased downward from the remainder of the upper frame 220. For example, the upper frame 220 may include a threaded rod 1500 that is received through the upper plate 224 and secured to the upper frame 220. A biasing member, such as a spring 1502, may be engaged with the upper plate 224 and the upper frame 220, and may force the upper plate 224 downward from the upper frame 220.

The clamp head 200 may also include a sensor 1504, e.g., a pneumatic valve, an electrical contact or switch, which may be secured to the upper frame 220 so as to be stationary with respect thereto. A bolt 1506 may be secured to the upper plate 224 and movable therewith with respect to the upper frame 220 and the sensor 1504.

Accordingly, the end of the bolt 1506 may initially be held away from the sensor 1504, as the upper plate 224 is biased downward from the upper frame 220. When the upper plate 224 engages the first clamp member 1400, the upper frame 220 may move downward with respect to the upper plate 224, compressing the spring 1502 and causing the end of the bolt 1506 to contact the sensor 1504. This may generate a feedback signal that represents that the upper plate 224 has landed on the first clamp member 1400.

Because the distance between the upper plate 220 and the retention lid positioner 202 is dictated by the dimensions of the clamp head 200, the distance may be known with some degree of certainty. Accordingly, the retention lid positioner 202 may be offset from the upper plate 224 to a location that coincides with a target location on the first clamp member 1400 when the upper plate 224 engages the top of the first clamp member 1400 and the sensor 1504 is depressed. It will be appreciated that a variety of other sensors may be provided and configured to precisely align the clamp head 200 with the clamp 210, e.g., various magnetic sensors, electric switches, optical sensors, etc. The process may be permitted to proceed once the feedback signal representing vertical alignment of the upper frame 220 is received (e.g., by the controller 204).

Figure 16:
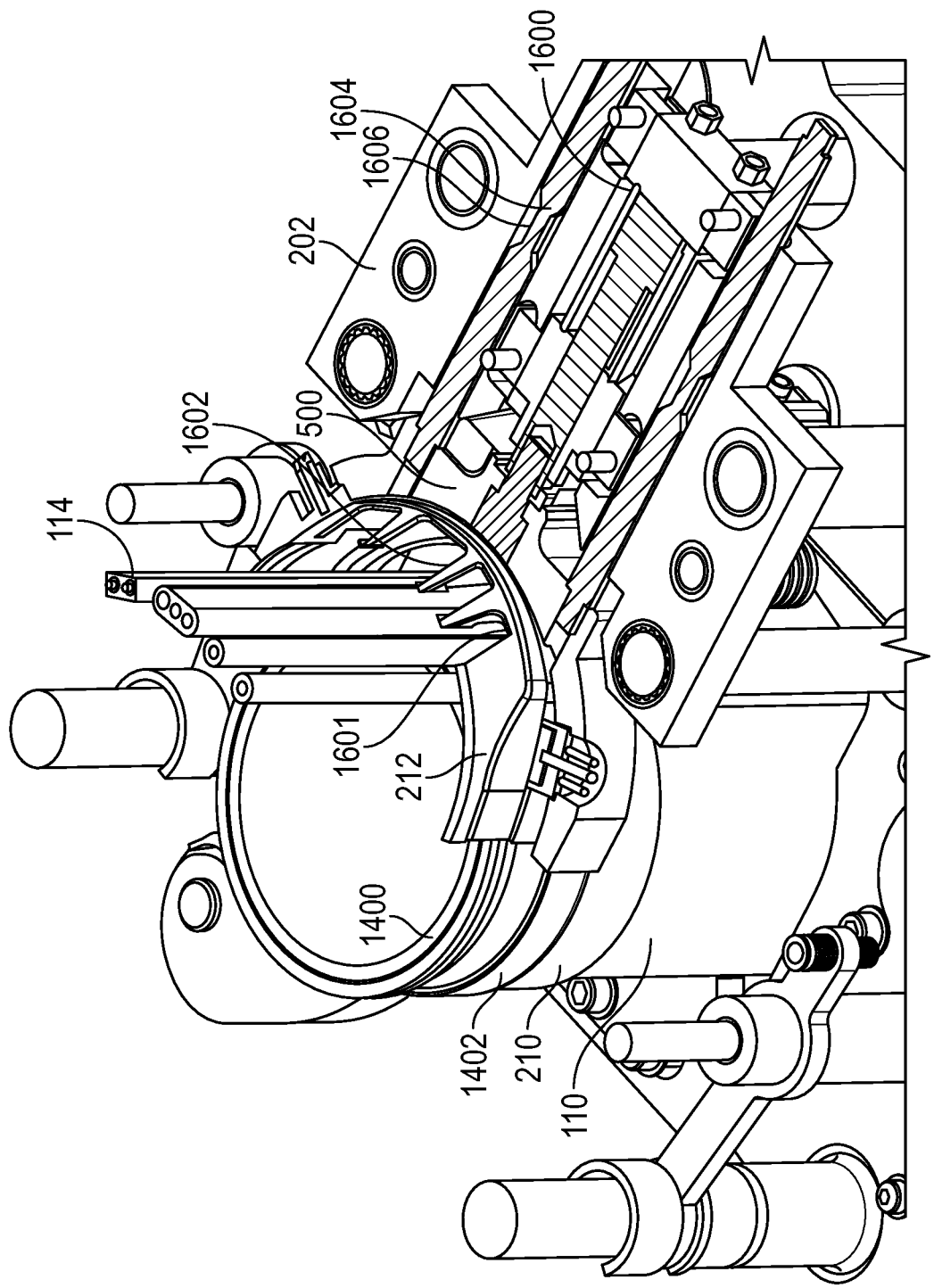
FIG. 16 illustrates a perspective view of the retention lid positioner, according to an embodiment.

The retention lid positioner 202 also provides a sensor in at least some embodiments. For example, FIG. 16 illustrates a perspective view of the retention lid positioner 202, according to an embodiment. This view is generally along the section represented by line 16-16 in FIG. 7. As discussed above with respect to FIG. 5, the retention lid positioner 202 may be laterally extendable, e.g., toward and away from the tubular string 110, shown in FIG. 16. For example, a linear actuator 1600 may be provided, which may drive the receiver 500 laterally with respect to the tubular string 110.

The sensor of the retention lid positioner 202 may be configured to provide a feedback signal representing that the receiver 500 has brought the retention lid 212 into position at a target location of the clamp 210. The target location may be at least partially on the first clamp member 1400. Further, the sensor may indicate whether the control line 114 is aligned with grooves 1601 in the retention lid 212, once the retention lid 212 is deployed, or if the control line 114 has been pinched between partitions 1602 between the grooves 1601 and the clamp 210. In particular, the sensor may determine whether the retention lid 212 has been fully deployed, or if the control line 114 placement prevented the retention lid 212 from fully deploying to the target location on the clamp 210.

In a specific embodiment, the sensor includes rods 1604, which may be part of the linear actuator 1600. The rods 1604 may include position indicators 1606, which in this case, may be necked down regions of the rods 1604, but could be any structure/feature capable of indicating a position for a sensor (e.g., a pneumatic valve, a magnetic portion, highly-visible portion for an optical sensor, extension/switch, etc.). In this embodiment, the position indicator 1606 may align with a valve element when the retention lid 212 is fully deployed, thereby producing the feedback signal representing the positioning of the retention lid 212 at the target location.

Figure 17:
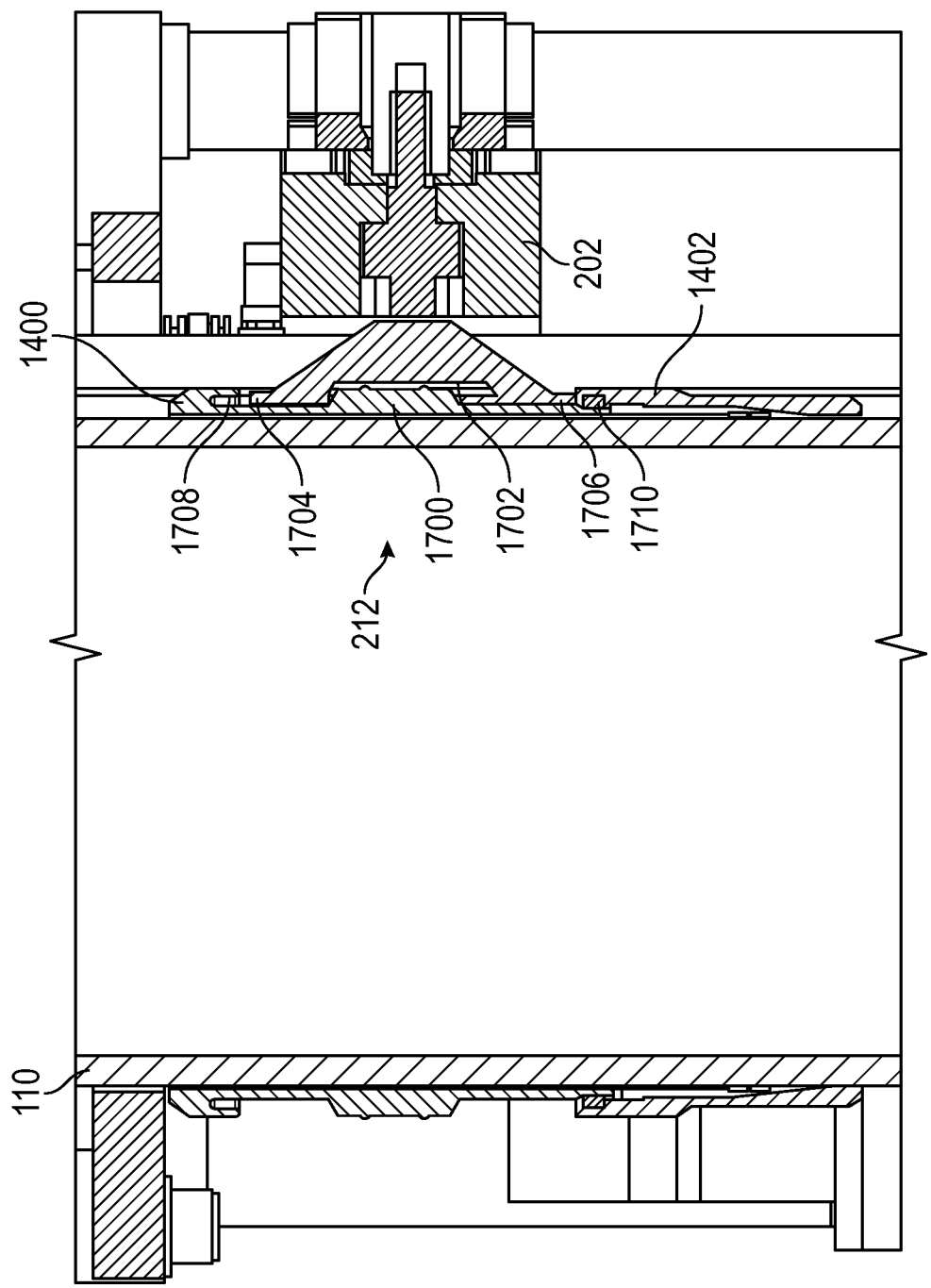
FIG. 17 illustrates a side, cross-sectional view of the retention lid positioned on the first clamp member on the tubular string, according to an embodiment.

FIG. 17 illustrates a side, cross-sectional view of the retention lid 212 positioned on the first clamp member 1400 on the tubular string 110, according to an embodiment. In this view, the retention lid 212 has been received into the target location on the first clamp member 1400, prior to adducting the first and second clamp members 1400, 1402 together. Note that the upper plate 220 is engaging the first clamp member 1400, providing the reference location to ensure alignment of the retention lid 212 with the target location on the first clamp member 1400.

The retention lid 212 may include lips 1704, 1706, and the first and second clamp members 1400, 1402, may each include an overhang 1708, 1710. The lips 1704, 1706 may be configured to slide under the overhang 1708, 1710, so as to entrain the retention lid 212 in the clamp 210 when the first and second clamp members 1400, 1402 are adducted together. Prior to adduction, however, the target location of the retention lid 212 may be axially between the overhangs 1708, 1710, as shown.

Figure 18A:
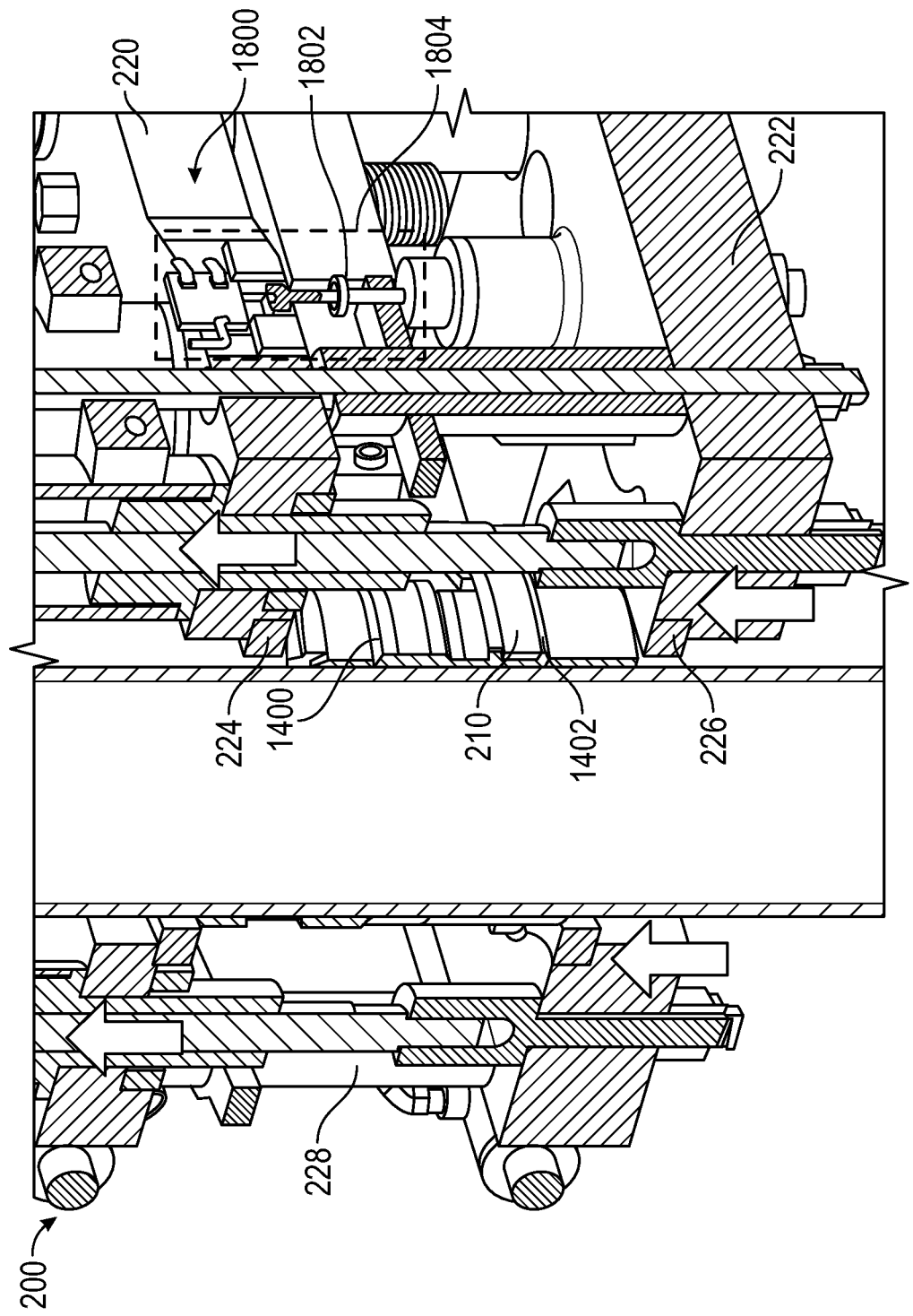
FIG. 18A illustrates a perspective view of part of the clamp head during the adduction process, according to an embodiment.
Figure 18B:
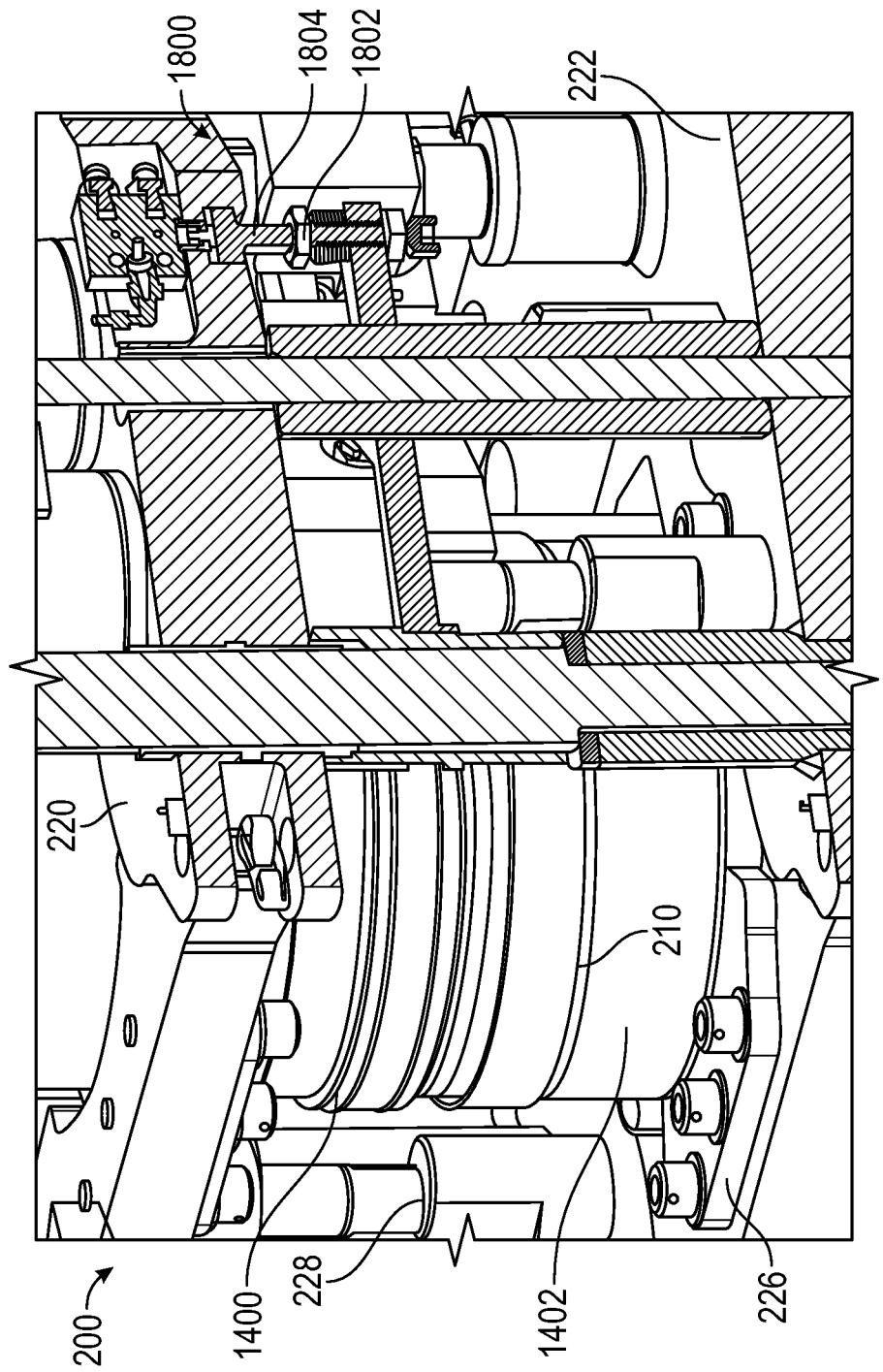
FIG. 18B illustrates a perspective view of the clamp head at the conclusion of the adduction process, according to an embodiment.

The clamp head 200 may then be configured to adduct the upper and lower load plates 224, 226 together, so as to press the first clamp member 1400 into the second clamp member 1402. FIG. 18A illustrates a perspective view of part of the clamp head 200 during the adduction process, according to an embodiment. FIG. 18B illustrates the clamp head 200 at the conclusion of the adduction process.

As shown, the driver 228 may be provided by one or more hydraulic cylinders, which may retract, thereby drawing the upper and lower frames 220, 222 together. In other embodiments, the driver 228 may be provided by other types of actuators. The upper and lower load plates 224, 226 bear upon the axial surfaces of the first and second clamp members 1400, 1402, thereby driving these clamp members 1400, 1402 together.

The clamp head 200 may include a sensor 1800 that detects when the clamp head 200 has completed the adduction process, e.g., when the upper and lower plates 224, 226 are separated apart by a distance that corresponds to the clamp members 1400, 1402 having been pressed together. In a specific embodiment, the sensor 1800 includes a bolt 1802 and a button 1804. The button 1804 may be connected to one of the upper and lower plates 224, 226, while the bolt 1802 is connected to the other. The bolt 1802 and the button 1804 may be positioned such that contact therebetween is made when the plates 224, 226 have completed the adduction process (e.g., FIG. 18B), thereby providing the feedback signal (e.g., pneumatic, electrical, hydraulic, etc.). In other embodiments, the sensor 1800 may be an optical sensor, electronic sensor, magnetic sensor, or any other suitable sensor.

FIGS. 19A and 19B illustrate a side view of the adduction process for the clamp 210, according to an embodiment. As shown, the retaining lid 212 may be received into the target location, which is on the first clamp member 1400, and spaced apart from the second clamp member 1402. The first clamp member 1400 may be driven into the second clamp member 1402, such that the lips 1704, 1706 are positioned radially within the overhangs 1708, 1710. Ratcheting profiles of the first and second camp members 1400, 1402 may prevent the first and second clamp members 1400, 1402 from separating, and the first and second clamp members 1400, 1402 may define a tapered profile that presses radially inward against the tubular 110, once installed. Thus, adducting the first and second clamp members 1400, 1402 may secure the clamp 210 to the tubular 110, while also securing the retention lid 212 to the first and second clamp members 1400, 1402. Further, the control line 114 (not visible in this view) may be received through the retention lid 212, it is likewise prevented from circumferential or radial displacement with respect to the tubular string 110 by the clamp 210.

Referring again to FIG. 12, after the adduction process is complete (as indicated by the feedback signal from the sensor 1800 of FIG. 18), the doors 600, 602 may be reopened and the clamp head 200 withdrawn from the tubular string 110 and returned to the loading position of FIG. 1.

Figure 20:
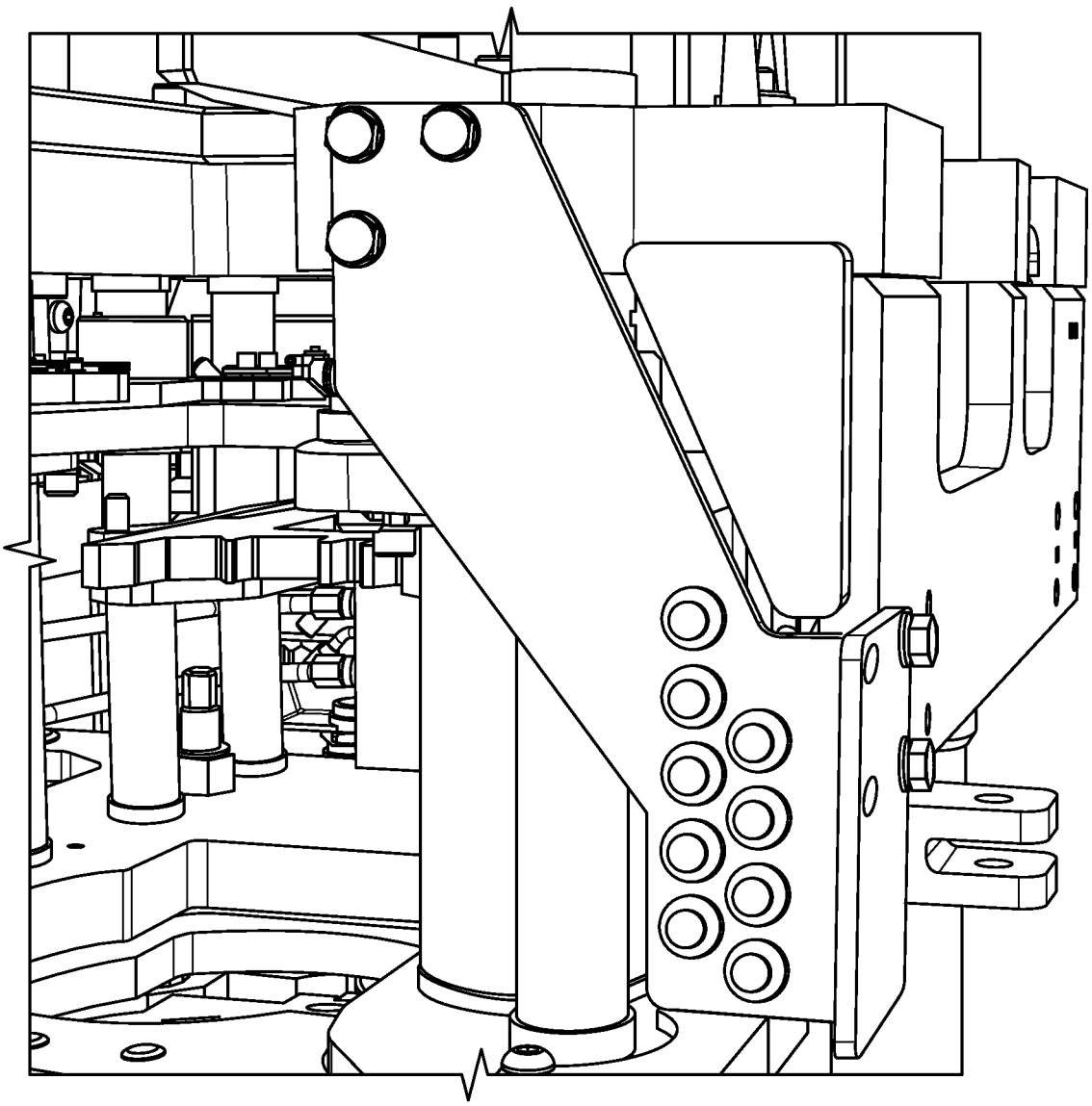
FIG. 20 illustrates perspective view of an indicator device 2000, according to an embodiment.

FIG. 20 illustrates perspective view of an indicator device 2000, according to an embodiment. The indicator device 2000 may include one or more lights 2002, which may correspond to one or more state labels 2004. The lights 2002 may be electronic or otherwise operated in response to signals from the various sensors of the control line system 104, as described with reference to the preceding figures. The lights 2002 may be any combination of colors, e.g., red and green. Further, in this embodiment, the labels 2004 are offset from, but arranged to correspond to the arrangement of the lights 2002. For example, the label, and thus the state, "float mode" 2004-1 may be active when only the light 2002-1 is illuminated. This may be the first stage of the operating process of the control line clamp installation system 104, e.g., prior to reaching the rough center position discussed above. When the pipe center sensor (e.g., described above with reference to FIG. 8) sends a signal indicating that the tubular 210 (e.g., FIG. 1) has been received, the light 2002-2 may light up, corresponding to the label 2004-2, in addition to the light 2002-1, and so on. In this embodiment, the lights 2002 may remain on as each successive state is reached, until the clamp 210 is fully installed and the control line clamp installation system 104 is reset for the next installation.

The indicator device 2000 thus provides rig personnel with visual confirmation of whether a sensor has been activated or not. The visual indication device may also include or instead be a screen/monitor. In some embodiments, the indicator device may be any device capable of providing a signal, data, or any other representation of a state of the control line clamp installation system 104 to a human and/or to a computer.

Figure 21A:
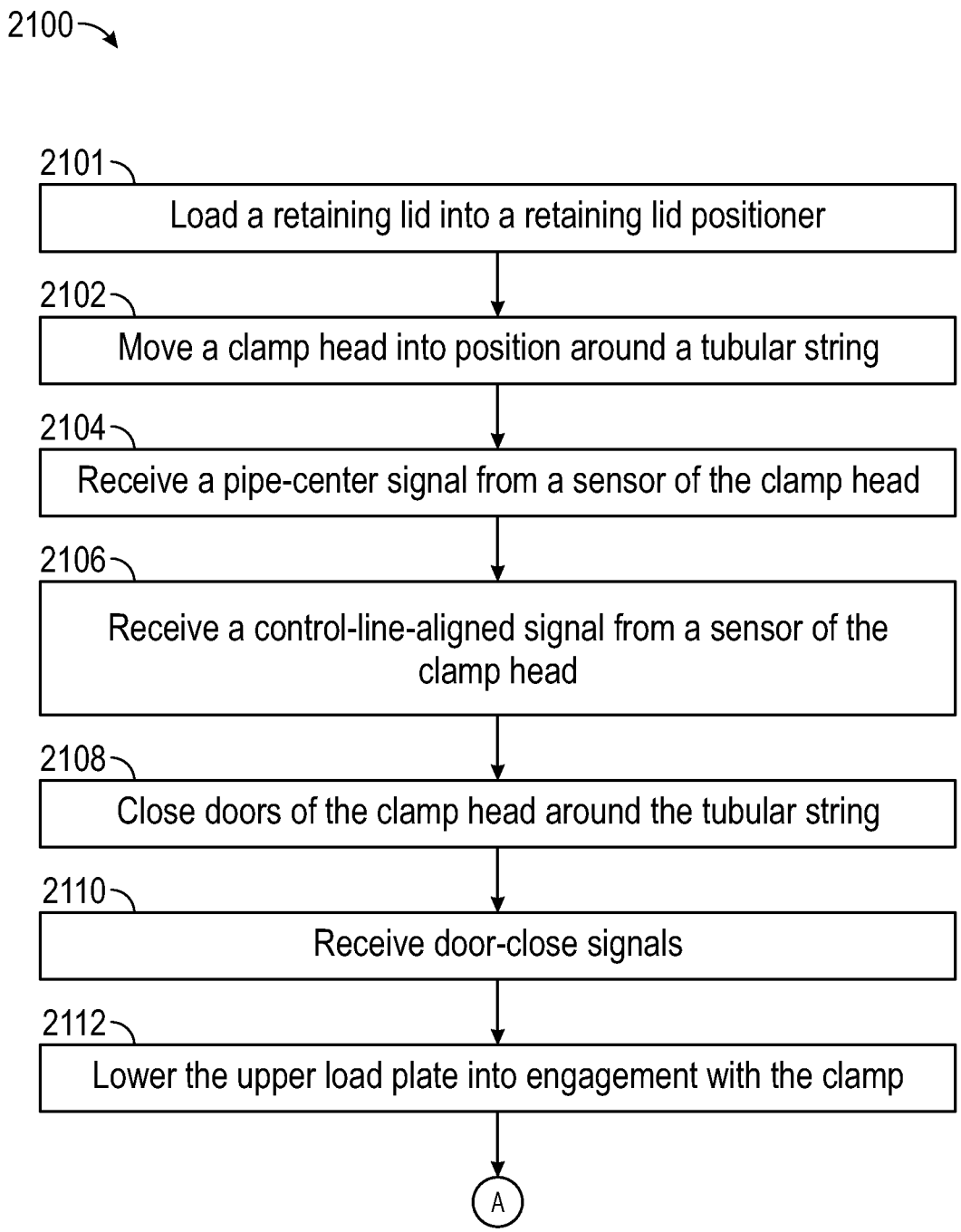
FIGS. 21A and 21B illustrate a flowchart of a method for installation a control line clamp on a tubular string, according to an embodiment.
Figure 21B:
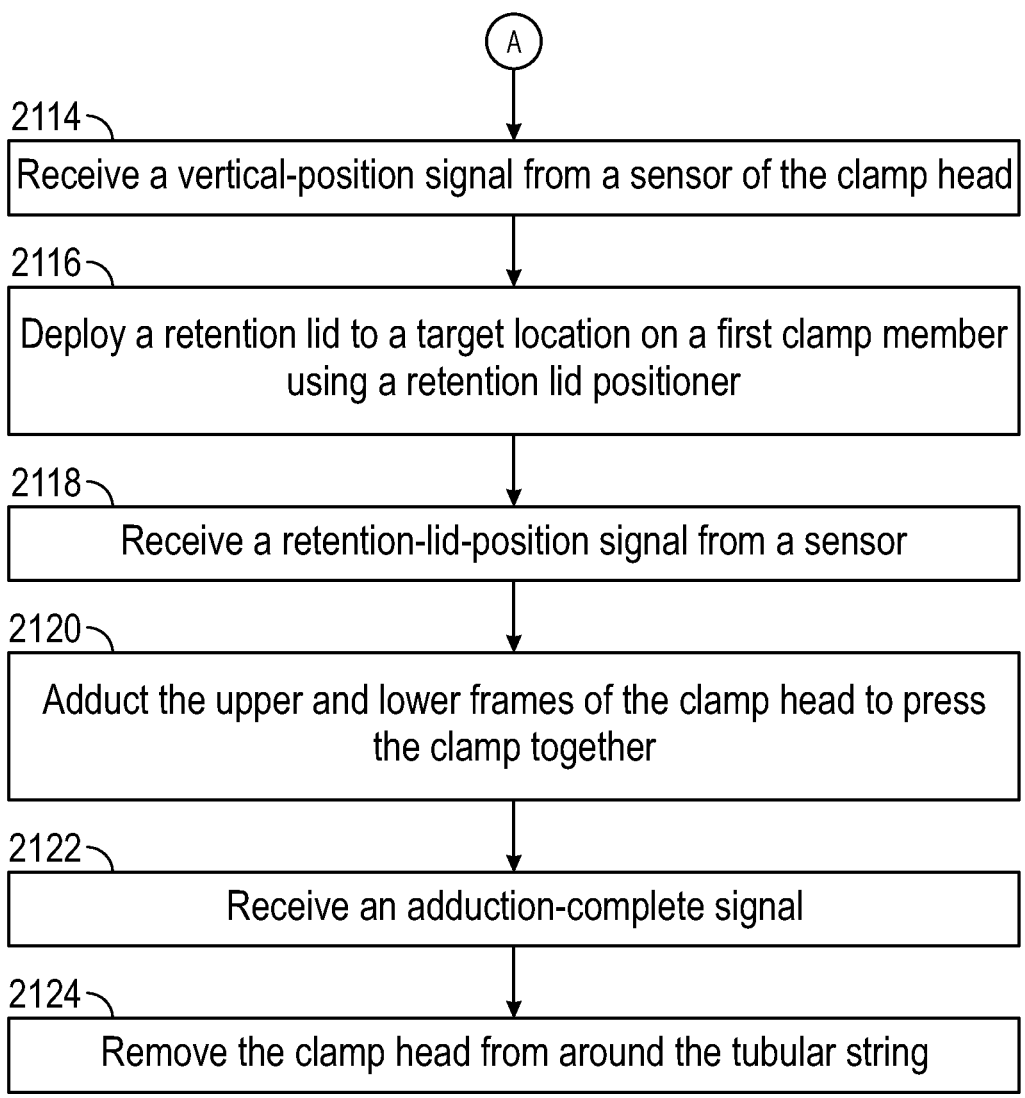

FIGS. 21A and 21B illustrate a flowchart of a method 2100 for installation a control line clamp on a tubular string, according to an embodiment. The method 2100 may be understood with reference to the embodiments of the control line installation system 100 of the preceding figures; however, it will be appreciated that at least some embodiments of the method 2100 may employ other devices. Further, the steps of the method 2100 may be completed in the order presented herein or in any other order. The individual steps may also be partitioned into two or more steps, and/or any two or more of the steps may be combined into a single step and/or performed in parallel. Moreover, at least some of the steps may be executed automatically and/or via human interaction with the controller 204.

The method 2100 may begin by loading a retaining lid 212 into a retaining lid positioner 202, as at 2101. This may proceed as shown in FIG. 4, with the clamp head 200 rotated and/or translated away from the tubular string 110 in a first or "loading" position. The retaining lid positioner 202 may include a sensor that may sense and provide a feedback signal representing that the retaining lid 212 has been properly loaded into the retaining lid positioner 202. The feedback is displayed on the indication device 2000. The controller 204 may prevent the method 2100 from proceeding until such feedback signal is received.

The clamp head 200 may then be moved into position around the tubular string 110, as at 2102. This may include pivoting and/or laterally extending the clamp head into a "rough center" position, as shown in FIGS. 6A and 6B. As noted above, the clamp head 200 may include upper and lower frames 220, 222, with upper and lower plates 224, 226, respectively. When the clamp head 200 is in the rough center position, the upper and lower plates 224, 226 may be disposed on opposite axial sides of a press-together clamp 210.

The method 2100 may include receiving a pipe-center feedback signal from a sensor of the clamp head 200, as at 2104. The sensor may indicate when the tubular string 110 has been fully received into the clamp head 200. The sensor may be provided as shown in and discussed above with respect to FIGS. 8, 9A, and 9B. The feedback signal may be displayed on the indication device 2100. The controller 204 may prevent the method from proceeding until such feedback signal is received.

The method 2100 may also include receiving a control-line-aligned feedback signal from a sensor of the clamp head 200, as at 2106. In some embodiments, the signals of steps 2104 and 2106 may be combined. In the embodiment of FIGS. 10, 11A, and 11B, however, a feedback signal is generated by the sensor assembly 1010. The default may be "no misalignment", but this status may change when the control line 114 is not properly aligned in the control line guide 1000, prompting the roller 1014 to come out of the groove 1018 and actuate the valve 1012, for example. In this embodiment, the control-line-aligned feedback signal is generated and received continuously, unless the control line 114 is out of alignment. In other embodiments, the feedback signal might be generated only when the control line 114 is properly received into the guide 1000. The feedback may be displayed on the indication device 2000. The controller 204 may prevent the method from proceeding until such feedback signal is received.

Once these two feedback signals are received, and, e.g., at least partially in response thereto, the method 2100 may be permitted to advance. Otherwise, the method 2100 may be stopped, and, e.g., corrective action taken to align the control line 114 and/or the clamp head 200 on the tubular string 110. When corrective action properly aligns the control line 114 and/or the clamp head 200, the feedback signals are received at the controller 204, which in turn allows the method 2100 to proceed.

The method 2100 may then proceed to closing the doors 600, 602 of the clamp head 200, e.g., of the upper and lower frames 220, 222, around the tubular string 110, as at 2108. A door-close sensor, as discussed above with reference to FIG. 13, may send a feedback signal when the door(s) 600, 602 is (are) closed, which may be received at 2110. The feedback may be displayed on the indication device 2000. The method 2100 may be prevented from continuing until such feedback signal is received.

At least partially in response to receiving these feedback signals, the method 2100 may proceed to lowering the upper load plate 224 into engagement with the first clamp member 1400 of the clamp 210, as at 2112. The controller 204 may accomplish this by sending control signals to one or more drivers that are configured to lower the upper frame 220 from the hanging frame 230, as the upper load plate 224 is attached to the upper frame 220. A sensor, e.g., between the relatively-movable upper plate 224 and the upper frame 220, may determine when the upper load plate 224 has engaged the first clamp member 1400. An example of such sensor is discussed above with respect to FIG. 15. Once the upper load plate 224 has reached engagement with the first clamp member 1400, the sensor may send an axial-position feedback signal representing that the upper frame 220 is in position. The feedback may be displayed on the indication device 2000.

The controller 204 may receive the vertical-position feedback signal at 2114 and stop the lowering of the upper frame 220 in response thereto. The feedback may be displayed on the indication device 2000. The controller 204 may be prevented from proceeding until the vertical-position feedback signal is received.

With the vertical-position feedback signal received, and at least partially in response thereto, the controller 204 may then deploy a retention lid 212 to a target location on the first clamp member 2016, as at 2116. This may proceed by extending the retention lid positioner 202, e.g., by the controller 204 signaling to the driver of the retention lid positioner 202.

The method 2100 may also include receiving a retention-lid-position feedback signal from a sensor, as at 2118. The retention-lid-position feedback signal may represent that the retention lid 212 is deployed to the target location on the first clamp member 1400 and the control line 114 is aligned within grooves 1601 of the retention lid 212, as shown in FIG. 16. Moreover, the sensor may be provided as shown in FIG. 16, or may be provided by another suitable sensor. The feedback may be displayed on the indication device 2000.

The method 2100 may be prevented from proceeding until the retention-lid-position feedback signal is received at the controller 204.

At least partially in response to receiving the retention-lid-position feedback signal, the method 2100 may then proceed to adducting the upper and lower frames 220, 222 of the clamp head 200 so as to press the clamp 210 together, as at 2120. As shown in FIGS. 18A and 18B, as the frames 220, 222 are adducted, e.g., by a driver 228, the load plates 224, 226 are driven together, which in turn presses the first clamp member 1400 into the second clamp member 1402. As can be seen in FIGS. 19A and 19B, this results in the retention lid 212 being held in place by the clamp 210, which in turn holds onto the tubular string 110. At the conclusion of such adduction, a sensor, e.g., the sensor 1800 of FIGS. 18A and 18B, may provide an adduction-complete feedback signal, which may be received by the controller 204, as at 2122. The feedback is displayed on the indication device. At least partially in response, the clamp head 200 may be removed from around the clamp 210 (e.g., doors open, laterally retracted, pivot away) and prepared for the next clamp, as at 2124.

As used herein, the terms "inner" and "outer"; "up" and "down"; "upper" and "lower"; "upward" and "downward"; "above" and "below"; "inward" and "outward"; "uphole" and "downhole"; and other like terms as used herein refer to relative positions to one another and are not intended to denote a particular direction or spatial orientation. The terms "couple," "coupled," "connect." "connection," "connected," "in connection with," and "connecting" refer to "in direct connection with" or "in connection with via one or more intermediate elements or members."

While the present teachings have been illustrated with respect to one or more implementations, alterations and/or modifications may be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." Further, in the discussion and claims herein, the term "about" indicates that the value listed may be somewhat altered, as long as the alteration does not result in nonconformance of the process or structure to the illustrated embodiment. The terms "first", "second", "third", etc. when referring to several elements is meant to differentiate between the elements for the sake of clarity, but not to imply an order, nor a particular number of elements. For example, the recitation of a "second" element does not imply that a "first" of the same element is also present, unless otherwise specifically stated.

Other embodiments of the present teachings will be apparent to those skilled in the art from consideration of the specification and practice of the present teachings disclosed herein. It is intended that the specification and examples be considered as exemplary only, with a true scope and spirit of the present teachings being indicated by the following claims.

What is claimed is:

1. An installation system for installing a control line clamp onto a tubular string, comprising:

a first load plate configured to be positioned at least partially around the tubular string;

a second load plate that is axially offset from the first load plate and configured to be positioned at least partially around the tubular string, the first and second load plates being configured to engage a first clamp member and a second clamp member, respectively, positioned on the tubular string;

a retention lid positioner configured to receive a retention lid and position the retention lid with respect to the first and second clamp members, so as to couple the retention lid with the first and second clamp members;

a sensor system configured to provide feedback signals representing that the first and second load plates are received around the tubular and aligned with a control line, the retention lid is positioned at a target location and aligned with the control line, and the first and second load plates are adducted together to press the first and second clamp members together;

an indication device configured to indicate a state of the installation system based at least in part on the feedback signals provided by the sensor system; and a first driver configured to adduct the first and second load plates together in an axial direction along the tubular string so as to press together the first and second clamp members positioned on the tubular string, such that the first and second clamp members retain the retention lid therebetween.

2. The installation system of claim 1, wherein the indication device comprises a display having indicators representing respective states of the installation system.

3. The installation system of claim 1, wherein the sensor system is further configured to provide a feedback signal representing that the retention lid is positioned in the retention lid positioner.

4. The installation system of claim 1, wherein the retention lid positioner is at least partially axially between the first and second load plates, and wherein the retention lid positioner is movable laterally toward and away from the tubular string.

5. The installation system of claim 1, wherein the sensor system comprises a pipe center sensor configured to provide a feedback signal representing that the first and second load plates are received around the tubular string and the tubular string is centered therein.

6. The installation system of claim 5, wherein the pipe center sensor comprises arms that pivot outwards into engagement with a contact sensor in response to the tubular string being received into the first and second load plates.

7. The installation system of claim 1, further comprising a control line guide that is axially adjacent to the first load plate, wherein the sensor system comprises a first control line guide sensor configured to provide a feedback signal representing that the control line is received into the control line guide.

8. The installation system of claim 1, further comprising a first door coupled the first load plate and a second door coupled to the second load plate, the sensor system comprising one or more load plate door sensors configured to provide a feedback signal representing that the first door is closed, the second door is closed, or both.

9. The installation system of claim 1, wherein the sensor system further comprises an axial position sensor coupled to the first load plate and configured to provide a feedback signal representing that the first load plate has engaged the first clamp member on the tubular.

10. The installation system of claim 1, wherein the sensor system further comprise a retention lid position sensor configured to provide a feedback signal representing whether the retention lid positioner has positioned the retention lid at the target location.

11. The installation system of claim 1, wherein the sensor system further comprises a clamping sensor configured to provide a feedback signal representing that the first and second load plates have adducted the first and second clamp members together to secure the first and second clamp members together and couple the retention lid thereto.

12. The installation system of claim 1, further comprising a pivoting connection configured to move the first load plate and the second load plate, at least, through an arc toward and away from the tubular string.

13. The installation system of claim 12, further comprising a lateral driver configured to move the first load plate, the second load plate laterally toward and away from the tubular string.

14. The installation system of claim 1 further comprising a controller configured to apply logic so as to control an installation, wherein the controller is configured to prevent one step of the installation from proceeding when manually activated unless a preceding step of the installation has been completed.

15. The installation system of claim 1, further comprising a controller configured to receive the feedback signals and to generate control signals to initiate activation of actuators of the installation system in response, wherein the controller is further configured to:
cause the retention lid positioner to move laterally toward the tubular string in response to receiving:
a first feedback signal representing that a retention lid has been received into the retention lid positioner,
a second feedback signal representing that the first and second load plates are received around the tubular;
a third feedback signal representing that the control line is received into a control line guide; and
a fourth feedback signal representing that the first load plate is contacting the first clamp member; and
cause the first load plate and the second load plate to adduct together, so as to press the first and second clamp members together in response to receiving a fifth feedback signal representing that the retention lid is positioned at the target location and has received the control line.

16. The installation system of claim 15, wherein the controller is further configured to:
prevent the retention lid positioner from moving toward the tubular string, and relative to the first and second load plates, until the controller receives the first, second, third, and fourth feedback signals; and
prevent the first and second load plates from adducting together until receiving the fifth feedback signal.

17. The installation system of claim 15, further comprising:
a second driver configured to move the retention lid positioner laterally with respect to the tubular string; and
a third driver configured to close a door of the first load plate, a door of the second load plate, or both,
wherein the first, second and third drivers are operable in response to the control signals generated by the controller.

18. A method, comprising:
receiving a control line retention lid into a retention lid positioner;
moving first and second load plates of a clamp installation system into position around a tubular string and a control line that extends along the tubular string, wherein a first clamp member and a second clamp member are positioned around the tubular and at least partially axially between the first and second load plates;
receiving a first feedback signal from a first sensor representing that the first and second load plates have received the tubular string and the control line;
in response to receiving the first feedback signal, closing doors of the first and second load plates, such that the first and second load plates circumscribe the tubular string;
at least partially in response to receiving the first feedback signal and closing the doors, moving the first load plate axially in a direction toward the second load plate;
receiving a second feedback signal representing that the first load plate with the retention lid positioner coupled thereto has reached a target location with respect the first clamp member;
at least partially in response to receiving the second feedback signal:
stopping movement of the first load plate vertically in the direction toward the second load plate, and
moving the retention lid positioner that carries a retention lid toward the tubular, such that the retention lid receives the control line and is positioned at the target location on the tubular string;
receiving a third feedback signal representing that that retention lid is positioned at the target location and the control line is received at least partially through the retention lid; and
at least partially in response to receiving the third feedback signal, adducting the first and second load plates axially together along the tubular string such that the first clamp member is pressed into engagement with a second clamp member positioned around the tubular string such that the retention lid is entrained between the first and second clamp members; and
indicating a state of the clamp installation system using an indication device based at least in part on the first, second, and third feedback signals.

19. The method of claim 18, further comprising receiving a fourth feedback signal from a retention lid sensor representing that the retention lid has been received into the retention lid positioner, wherein the first and second load plates are prevented from moving into position around the tubular string until the fourth feedback signal is received.

20. The method of claim 19, further comprising receiving a fifth feedback signal representing that the control line is aligned with a control line guide positioned adjacent to the first and second load plates, wherein the first load plate is prevented from moving axially in a direction toward the second load plate until the fifth feedback signal is received.

21. The method of claim 19, further comprising:
preventing moving the first load plate axially in a direction toward the second load plate until receiving at least the first and fourth feedback signals;
preventing moving the retention lid positioner until receiving at least the second feedback signal; and
preventing adducting the first and second load plates together until receiving the third feedback signal.

22. The method of claim 18, further comprising:
receiving a sixth signal representing that the first and second clamp members are pressed together;

in response to receiving the sixth signal, stopping the adduction of the first and second load plates; and retracting the first and second load plates from around the tubular string.

23. The method of claim 18, wherein moving first and second load plates into position comprises:

pivoting the first and second load plates through an arc toward the tubular string, the tubular string being at least partially deployed into a well; and moving the first and second load plates laterally toward the tubular string, after pivoting the first and second load plates, such that the first and second load plates laterally receive the tubular string to a centered position therein.

24. The method of claim 18, wherein moving the retention lid positioner that carries the retention lid toward the tubular comprises laterally moving the retention lid positioner such that the control line is received into a groove of the retention lid.

* * * * *